(12) United States Patent
Tong et al.

(10) Patent No.: US 7,872,989 B1
(45) Date of Patent: Jan. 18, 2011

(54) FULL MESH OPTIMIZATION FOR SPANNING TREE PROTOCOL

(75) Inventors: Xiaoming Tong, San Jose, CA (US); Nakul Pratap Saraiya, Palo Alto, CA (US)

(73) Assignee: Habanero Holdings, Inc., Saratoga, CA (US)

( * ) Notice: Subject to any disclaimer, the term of this patent is extended or adjusted under 35 U.S.C. 154(b) by 692 days.

(21) Appl. No.: 11/736,281

(22) Filed: Apr. 17, 2007

Related U.S. Application Data

(63) Continuation-in-part of application No. 11/256,668, filed on Oct. 22, 2005, and a continuation-in-part of application No. 11/256,646, filed on Oct. 22, 2005, and a continuation-in-part of application No. 11/256,645, filed on Oct. 22, 2005, now Pat. No. 7,843,906, and a continuation-in-part of application No. 11/256,688, filed on Oct. 22, 2005, now Pat. No. 7,843,907, and a continuation-in-part of application No. 11/057,120, filed on Feb. 12, 2005, now abandoned, and a continuation-in-part of application No. 11/057,048, filed on Feb. 12, 2005, now Pat. No. 7,685,281, and a continuation-in-part of application No. 11/057,117, filed on Feb. 12, 2005, and a continuation-in-part of application No. 11/057,035, filed on Feb. 12, 2005, and a continuation-in-part of application No. 11/057,034, filed on Feb. 12, 2005, and a continuation-in-part of application No. 11/057,114, filed on Feb. 12, 2005, and a continuation-in-part of application No. 11/057,046, filed on Feb. 12, 2005, now abandoned, and a continuation-in-part of application No. 11/057,112, filed on Feb. 12, 2005, now Pat. No. 7,664,110, and a continuation-in-part of application No. 11/057,119, filed on Feb. 12, 2005, now Pat. No. 7,561,571, and a continuation-in-part of application No. 11/057,036, filed on Feb. 12, 2005, and a continuation-in-part of application No. 11/057,037, filed on Feb. 12, 2005, and a continuation-in-part of application No. 11/057,121, filed on Feb. 12, 2005, and a continuation-in-part of application No. 11/057,038, filed on Feb. 12, 2005, and a continuation-in-part of application No. 11/057,113, filed on Feb. 12, 2005, and a continuation-in-part of application No. 11/057,116, filed on Feb. 12, 2005, and a continuation-in-part of application No. 10/889,469, filed on Jul. 12, 2004, now abandoned, and a continuation-in-part of application No. 10/889,467, filed on Jul. 12, 2004, and a continuation-in-part of application No. 10/889,468, filed on Jul. 12, 2004, now Pat. No. 7,757,033.

(60) Provisional application No. 60/909,141, filed on Mar. 30, 2007, provisional application No. 60/827,305, filed on Sep. 28, 2006, provisional application No. 60/717,147, filed on Sep. 14, 2005, provisional application No. 60/684,542, filed on May 25, 2005, provisional application No. 60/651,026, filed on Feb. 7, 2005, provisional application No. 60/651,027, filed on Feb. 7, 2005, provisional application No. 60/650,707, filed on Feb. 7, 2005.

(51) Int. Cl.
*H04L 12/28* (2006.01)
*H04Q 11/00* (2006.01)
(52) U.S. Cl. .................. 370/254; 370/256; 370/400
(58) Field of Classification Search .............. None
See application file for complete search history.

(56) References Cited

U.S. PATENT DOCUMENTS

| 2004/0153708 A1* | 8/2004 | Joshi et al. ............. 714/4 |
| 2004/0190454 A1* | 9/2004 | Higasiyama ............ 370/238 |
| 2008/0239957 A1* | 10/2008 | Tokura et al. ........... 370/235 |

* cited by examiner

*Primary Examiner*—Chirag G Shah
*Assistant Examiner*—Nima Mahmoudzadeh
(74) *Attorney, Agent, or Firm*—PatentVentures; Bennett Smith; Korbin Van Dyke

(57) ABSTRACT

An optimized spanning tree protocol (OSTP) minimizes latency and provides high throughput in a full-mesh portion of a network, and is compatible with external networks where a standard spanning tree protocol is used. The OSTP enables traffic traversing the full-mesh portion to take a shortest path from source to destination through use of full-mesh connectivity. In some embodiments, a cluster includes a plurality of servers connected in a full mesh, and the OSTP is used on internal ports of the servers. In some embodiments, the OSTP is configured on a per-VLAN basis. In some embodiments, the servers exchange special messages enabling determination of full-mesh connectivity. In further embodiments, sending of the special messages is suppressed on certain port types, such as external ports. In some embodiments, determination of the full-mesh connectivity disables use of a standard spanning tree protocol and/or enables use of OSTP on the full-mesh portion.

24 Claims, 7 Drawing Sheets

FULL MESH OPTIMIZATION FOR SPANNING TREE PROTOCOL

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all owned by the owner of the instant application:

U.S. Provisional Application Ser. No. 60/909,141, filed 30 Mar. 2007, first named inventor Xiaoming Tong, and entitled Full Mesh Optimization for Spanning Tree Protocol; and U.S. Provisional Application Ser. No. 60/827,305, filed 28 Sep. 2006, first named inventor Xiaoming Tong, and entitled Full Mesh Optimization for Spanning Tree Protocol;

U.S. Non-Provisional application Ser. No. 11/256,668, filed Oct. 22, 2005, by Nakul Saraiya, et al., and entitled STORAGE GATEWAY FOR FABRIC-BACKPLANE ENTERPRISE SERVERS;

U.S. Non-Provisional application Ser. No. 11/256,646, filed Oct. 22, 2005, by Jia-Jen Yeh, et al., and entitled STORAGE GATEWAY PROVISIONING AND CONFIGURATION FOR FABRIC-BACKPLANE ENTERPRISE SERVERS;

U.S. Non-Provisional application Ser. No. 11/256,645, filed Oct. 22, 2005, by Sriram Chidambaram, et al., and entitled STORAGE GATEWAY INITIATOR FOR FABRIC-BACKPLANE ENTERPRISE SERVERS;

U.S. Non-Provisional application Ser. No. 11/256,688, filed Oct. 22, 2005, by Akram Abou-Emara, et al., and entitled STORAGE GATEWAY TARGET FOR FABRIC-BACKPLANE ENTERPRISE SERVERS;

U.S. Provisional Application Ser. No. 60/717,147, filed Sep. 14, 2005, by Nakul Saraiya, et al., and entitled SCSI TRANSPORT FOR FABRIC-BACKPLANE ENTERPRISE SERVERS;

U.S. Provisional Application Ser. No. 60/684,542, filed May 25, 2005, by Nakul Saraiya, et al., and entitled STORAGE GATEWAY FOR FABRIC-BACKPLANE ENTERPRISE SERVERS;

U.S. Non-Provisional application Ser. No. 11/057,120, filed Feb. 12, 2005, by Nakul Saraiya, et al., and entitled TEMPLATE SYSTEM FOR PROVISIONING AND MANAGEMENT OF FABRIC-BACKPLANE ENTERPRISE SERVERS;

U.S. Non-Provisional application Ser. No. 11/057,048, filed Feb. 12, 2005, by Nakul Saraiya, et al., and entitled PROGRAMMATIC INSTANTIATION, PROVISIONING, AND MANAGEMENT OF FABRIC-BACKPLANE ENTERPRISE SERVERS;

U.S. Non-Provisional application Ser. No. 11/057,117, filed Feb. 12, 2005, by Sharad Mehrotra, et al., and entitled CONTROL AGENT MANAGEMENT OF MULTI-CHASSIS FABRIC-BACKPLANE ENTERPRISE SERVERS;

U.S. Non-Provisional application Ser. No. 11/057,035, filed Feb. 12, 2005, by Sharad Mehrotra, et al., and entitled MULTI-CHASSIS FABRIC-BACKPLANE ENTERPRISE SERVERS;

U.S. Non-Provisional application Ser. No. 11/057,034, filed Feb. 12, 2005, by Nakul Saraiya, and entitled UPPER/LOWER NETWORK ADDRESS TAKEOVER VIA FABRIC-BACKPLANE FORWARDING TABLE UPDATES;

U.S. Non-Provisional application Ser. No. 11/057,114, filed Feb. 12, 2005, by Nakul Saraiya, and entitled RAPID IP/MAC ADDRESS TAKEOVER VIA FORWARDING TABLE UPDATES;

U.S. Non-Provisional application Ser. No. 11/057,046, filed Feb. 12, 2005, by Mangesh Shingane, et al., and entitled LINK AGGREGATION GROUPS IN FABRIC-BACKPLANE ENTERPRISE SERVERS;

U.S. Non-Provisional application Ser. No. 11/057,112, filed Feb. 12, 2005, by Thomas Dean Lovett, et al., and entitled INPUT/OUTPUT CONTROLLER FOR COUPLING THE PROCESSOR-MEMORY COMPLEX TO THE FABRIC IN FABRIC-BACKPLANE ENTERPRISE SERVERS;

U.S. Non-Provisional application Ser. No. 11/057,119, filed Feb. 12, 2005, by Thomas Dean Lovett, et al., and entitled FABRIC ADDRESS AND SUB-ADDRESS RESOLUTION IN FABRIC-BACKPLANE ENTERPRISE SERVERS;

U.S. Non-Provisional application Ser. No. 11/057,036, filed Feb. 12, 2005, by Thomas Dean Lovett, et al., and entitled PROCESSOR-MEMORY MODULE PERFORMANCE ACCELERATION IN FABRIC-BACKPLANE ENTERPRISE SERVERS;

U.S. Non-Provisional application Ser. No. 11/057,037, filed Feb. 12, 2005, by Thomas Dean Lovett, et al., and entitled FRAME FORWARDING LOOKUPS IN FABRIC-BACKPLANE ENTERPRISE SERVERS;

U.S. Non-Provisional application Ser. No. 11/057,121, filed Feb. 12, 2005, by Yuri Finkelstein, et al., and entitled REAL TIME DETECTION OF CHANGED RESOURCES FOR PROVISIONING AND MANAGEMENT OF FABRIC-BACKPLANE ENTERPRISE SERVERS;

U.S. Non-Provisional application Ser. No. 11/057,038, filed Feb. 12, 2005, by Yuri Finkelstein, et al., and entitled UNUSED RESOURCES RECOGNITION IN REAL TIME FOR PROVISIONING AND MANAGEMENT OF FABRIC-BACKPLANE ENTERPRISE SERVERS;

U.S. Non-Provisional application Ser. No. 11/057,113, filed Feb. 12, 2005, by Yuri Finkelstein, et al., and entitled REAL TIME NOTICE OF NEW RESOURCES FOR PROVISIONING AND MANAGEMENT OF FABRIC-BACKPLANE ENTERPRISE SERVERS;

U.S. Non-Provisional application Ser. No. 11/057,116, filed Feb. 12, 2005, by Thomas Dean Lovett, et al., and entitled FABRIC-BACKPLANE ENTERPRISE SERVERS WITH VNICS AND VLANS;

U.S. Provisional Application Ser. No. 60/651,026, filed Feb. 7, 2005, by Yuri Finkelstein, et al., and entitled DURABLE QUERY REGISTRATION WITH REAL TIME RESPONSE;

U.S. Provisional Application Ser. No. 60/651,027, filed Feb. 7, 2005, by Fabio Ingrao, et al., and entitled DYNAMIC USER INTERFACE SPECIFICATION FOR A PREDETERMINED INTERFACE ENGINE;

U.S. Provisional Application Ser. No. 60/650,707, filed Feb. 7, 2005, by Yuri Finkelstein, et al., and entitled CLASS INSTANCE RELATIONSHIP QUERY WITH OPTIONAL CONSTRAINTS;

U.S. Non-Provisional application Ser. No. 10/889,469, filed Jul. 12, 2004, by Thomas Dean Lovett, et al., and entitled COMPUTE RESOURCES FOR FABRIC-BACKPLANE ENTERPRISE SERVERS;

U.S. Non-Provisional application Ser. No. 10/889,467, filed Jul. 12, 2004, by Sharad Mehrotra, et al., and entitled CLIENT-SERVER AND APPLICATION MODELS IN FABRIC-BACKPLANE ENTERPRISE SERVERS; and U.S. Non-Provisional application Ser. No. 10/889,468, filed Jul. 12, 2004, by Sharad Mehrotra, et al., and entitled FABRIC-BACKPLANE ENTERPRISE SERVERS.

BACKGROUND

1. Field

Advancements in interprocess and inter-module communications in servers and server clusters, including organization, provisioning, management, and interoperation of compute, storage, and network resources to enhance datacenter availability, efficiency, and utilization are needed to provide improvements in performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

Data center compute complexes access numerous storage devices. What is needed are effective techniques for making the accesses efficiently and reliably.

SYNOPSIS

The invention may be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Example Embodiments of one or more of systems, methods, articles of manufacture, and computer readable media in accordance with the concepts described herein. As is discussed in more detail in the Conclusions, the invention encompasses all possible modifications and variations within the scope of the issued claims.

DETAILED DESCRIPTION

Figure 1A:
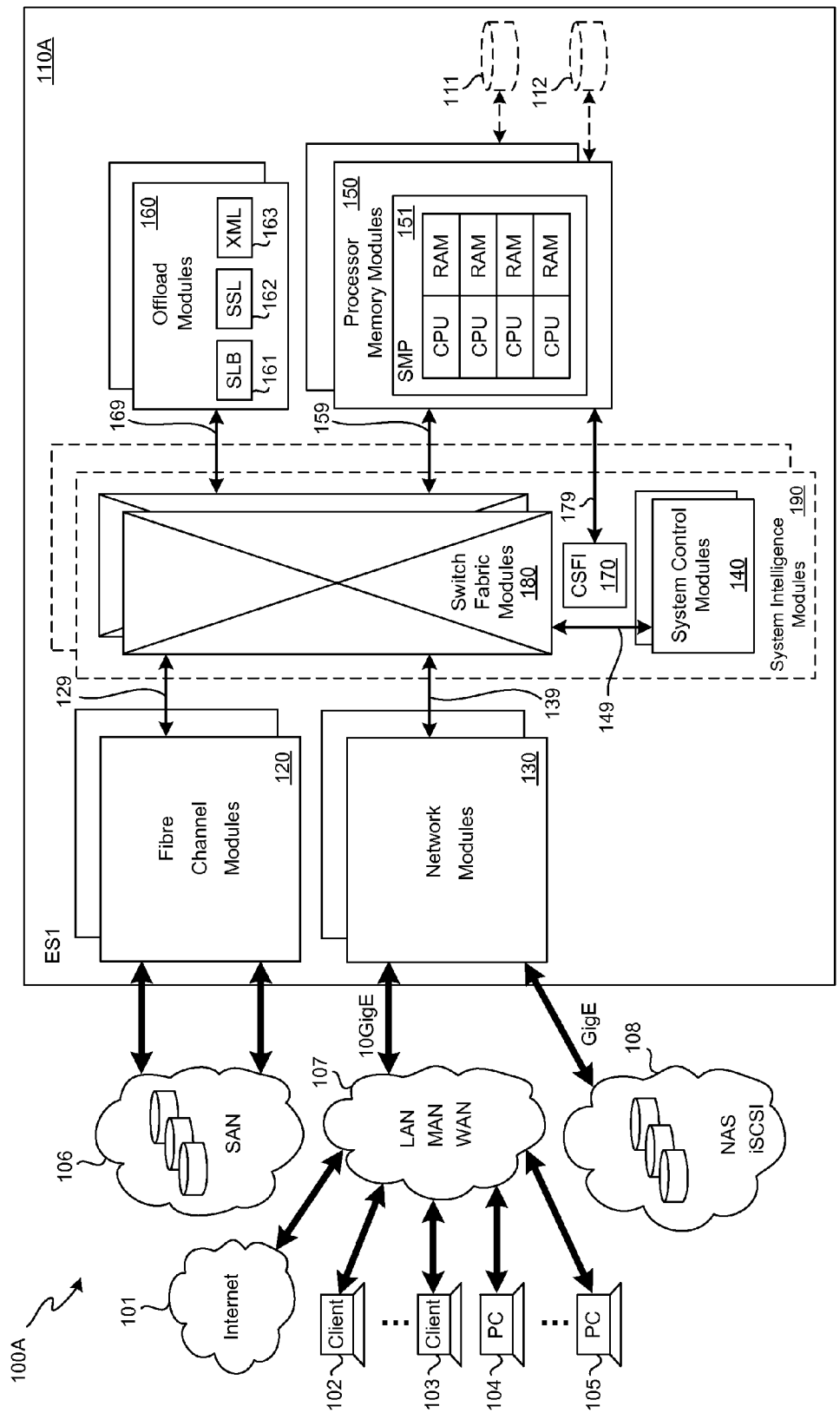
FIG. 1A illustrates a conceptual representation of an embodiment of an Enterprise Server (ES) system.

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Acronyms

Elsewhere herein various shorthand abbreviations, or acronyms, are used to refer to certain elements. The descriptions of at least some of the acronyms follow.

TABLE 1

| Acronym | Description |
| --- | --- |
| ALM | Application Modules |
| APM | Application Processor Module |
| BPDU | Bridge Protocol Data Unit |
| CLI | Command-Line Interface |
| CP | Control Protocol |
| CPU | Central Processing Unit |
| CSFI | Coherency Switch Fabric and Interconnect |
| DA | Destination Address |
| DDP | Direct Data Placement |
| EF | Enterprise Fabric |
| ES | Enterprise Server |
| FC | Fibre Channel |
| FCI | Fibre Channel Interface |
| FCM | Fibre Channel Module |
| FIB | Forwarding Information Base |
| GUI | Graphical User Interface |
| HBA | Host Bus Adaptor |
| I/O | Input/Output |
| IP | Internet Protocol |
| L2 | Layer Two |
| L3 | Layer Three |
| LAG | Link Aggregation Group |
| LAN | Local Area Network |
| MAC | Media Access Control(ler) |
| MACDA | Media Access Controller Destination Address |
| MAN | Metro Area Network |
| NIC | Network Interface Controller |
| NM | Network Module |
| OLB | OffLoad Board |
| O/S | Operating System |
| OSPF | Open Shortest Path First |
| OSTP | Optimized Spanning Tree Protocol |
| PMM | Processor Memory Module |
| RAS | Reliability, Availability, and Serviceability |
| RDMA | Remote Direct Memory Access |
| RSTP | Rapid Spanning Tree Protocol |
| SAN | Storage Area Network |
| SCF | Server Configuration File |
| SCM | System Control Module |
| SIM | System Intelligence Module |
| SLB | Server Load Balancing |
| SMP | Symmetric MultiProcessor |
| SSL | Secure Sockets Layer |
| STP | Spanning Tree Protocol |
| TCP | Transmission Control Protocol |
| TLS | Transport Layer Security |
| VHBA | Virtual Host Bus Adaptor |
| VIOC | Virtual Input/Output Controller |
| VLAN | Virtual Local Area Network |
| VNIC | Virtual Network Interface Controller |
| WAN | Wide Area Network |
| XML | eXtensible Markup Language |

Overview

Multi-chassis fabric-backplane enterprise servers include a plurality of chassis managed collectively to form one or more provisioned servers. A central client coordinates gathering of provisioning and management information from the chassis, and arranges for distribution of control information to the chassis. One of the chassis may perform as a host or proxy with respect to information and control communication between the client and the chassis. In some embodiments, server provisioning and management information and commands move throughout the chassis via an Open Shortest Path First (OSPF) protocol. Alternatively, the client may establish individual communication with a subset of the chassis, and directly communicate with chassis in the subset. Server provisioning and management information includes events generated when module status changes, such as when a module is inserted and becomes available, and when a module fails and is no longer available. Each chassis includes a switch fabric enabling communication between chassis modules.

A hybrid server/multi-layer switch system architecture, referred to hereinafter as the Enterprise Fabric (EF) architecture, forms the basis for a number of ES chassis embodiments. Each ES embodiment includes one or more Processor Memory Modules (PMMs, each having a symmetric multi-processor complex), one or more Network Modules, and a System Intelligence Module (SIM). The SIM includes a cellified switching-fabric core (SF) and a System Control Module (SCM).

Each PMM has one or more resident Virtual I/O Controller (VIOC) adapters. Each VIOC is a specialized Input/Output (I/O) controller that includes embedded layer-2 forwarding and filtering functions and tightly couples the PMM to the SF. Thus the layer-2 switch functionality within the ES chassis is distributed throughout various pluggable modules (such as SIMs, NMs, and PMMs). Through the use of VIOC/VNIC device drivers, host operating system software (Host O/S) running on the PMMs is presented with a plurality of Virtual Network Interface Cards (VNICs). In some embodiments, each VNIC behaves as a high-performance Ethernet interface at the full disposal of the Host O/S. In other embodiments, at least some of the VNICs behave as high-performance FC Host Bus Adaptors (HBAs).

The SCM is responsible for provisioning and overall system management. Via system control and management processes running on the SIM, the server and switch functionality of the ES chassis are provisioned via configuration files in accordance with respective requirements specified by server and network administrators. Configurable parameters for each server include the number of processors, memory, the number of VNICs, and VNIC bandwidth. Configurable parameters for the network include VLAN assignments for both Network Module ports and VNICs and Link Aggregation Group (LAG) definitions.

An Enterprise Server (ES) system may be operated as one or more provisioned servers, each of the provisioned servers including capabilities as identified by a corresponding set of specifications and attributes, according to various embodiments. Typically the specifications (or constraints) and attributes are specified with a Server Configuration File. An ES system may be provisioned into any combination and number of servers according to needed processing and I/O capabilities. Each of these servers may include distinct compute, storage, and networking performance. Provisioned servers may be managed similar to conventional servers, including operations such as boot and shutting down.

One or more VNICs provide for communication among modules of ES embodiments via a switch fabric dataplane. Processes executing on compute complexes of the servers exchange data as packets or messages by interfaces made available through VNICs. The VNICs further provide for transparent communication with network and storage interfaces. VNIC provisioning capabilities include programmable bandwidth, priority scheme selection, and detailed priority control (such as round-robin weights). In some embodiments, VNICs are implemented in VIOCs. In another aspect, VLANs enable access to Layer-2 (L2) and selected Layer-3 (L3) network functions while exchanging the packets and messages. VLAN identification is provided in each VNIC, and VLAN processing is partially performed in VIOCs implementing VNICs.

The EF architecture provides for provisioning virtual servers (also known as server-instances) with included virtual networks from underlying ES hardware and software resources. The EF architecture is applicable to application scenarios requiring dynamic combinations of compute, network, and storage performance and capabilities, and is a unifying solution for applications requiring a combination of computation and networking performance. Resources may be pooled, scaled, and reclaimed dynamically for new purposes as requirements change, using dynamic reconfiguration of virtual computing and communication hardware and software. This approach offers the advantages of reduced cost, as provisioning is "just-right" rather than over-provisioned. In addition, dynamic configuration allows for quick performance or scale modifications.

The EF architecture provides a radically different underlying server architecture compared to traditional multi-way Symmetric MultiProcessor (SMP) servers, including integrated fabric interconnectivity to enable high-bandwidth, low-latency I/O operation. Processing and I/O throughput are virtualized, providing scalable, coordinated resources. Partitioning and fail-over are hardware supported, including mechanisms for treating multiple virtual servers as a single managed entity, resulting in new high availability clustering and multi-site fail-over capabilities. Compared to a current network switch, networking capabilities are extended, including efficient RDMA, high-performance Direct Data Placement (DDP), and flexible resource pooling. Virtualized fabric services, such as Server Load Balancing (SLB), Secure Sockets Layer (SSL) protocols including Transport Layer Security (TLS) variants, eXtensible Markup Language (XML), and so forth, are also provided.

In some embodiments, a data center or other installation implemented in accordance with the EF architecture will include one or more ES chassis. In a first embodiment, the ES chassis capabilities include an 8-way SMP partition-configurable compute complex. These compute resources include a plurality of 64-bit x86 processing elements. The ES chassis hardware configuration is compatible with execution of software operating systems such as Linux and Microsoft Windows. Processing elements in the ES chassis are coupled to a low-latency high-bandwidth interconnect fabric via virtualized I/O functions, providing for efficient communication between processing elements and with network and FC interfaces coupled to the fabric. The virtualized I/O functions are distributed throughout the plurality of processing elements. Among the virtualized I/O functions, the ES chassis includes VNICs and VHBAs. Via these VNICs and VHBAs, the processing elements can selectively communicate with external networks coupled to any of several high-performance network interfaces (up to three 10 Gb Ethernet interfaces, or thirty 1 Gb Ethernet interfaces, in the first embodiment) and with several high-performance 2 Gb FC interfaces (up to eight per FCM in the first embodiment). Each VNIC/VHBA can be individually configured such that it appears to be coupled to a multi-port switch coupled to other of the VNICs/VHBA and to the network/storage interfaces. Alternatively, each VNIC/VHBA can be configured such that it appears to be directly coupled to one of the network/storage interfaces. Additional processing capabilities may be provided in the chassis in the form of offload cards (or pluggable boards or modules) supporting virtualized services, such as SLB, SSL, and XML processing.

The ES chassis is further configured with capabilities to provide for a high availability system, including modular components, hot-swap of components, and fully redundant components. Other high availability capabilities include multi-site fail-over and mainframe class Reliability, Availability, and Serviceability (RAS) features.

An ES system may be operated as one or more provisioned servers, each of the provisioned servers including capabilities as identified by a corresponding set of specifications and attributes, according to various embodiments. Typically the specifications (or constraints) and attributes are specified with a Server Configuration File (SCF). An ES system may be provisioned into any combination and number of servers according to needed processing and I/O capabilities. Each of these servers may include distinct compute, storage, and networking performance. Provisioned servers may be managed similar to conventional servers, including operations such as boot and shutting down.

In some embodiments, internal interconnectivity within a chassis, such as via the SF, provides full-mesh (point-to-point) connectivity for a plurality of connected servers in the chassis. In some usage scenarios, interconnectivity among multiple chassis provides, at least in part, full-mesh connectivity among a plurality of servers in the multiple chassis.

An ES cluster includes a plurality of connected ES-based servers in one or more ES chassis. The ES chassis being provisionable into any combination and number of servers according to needed processing and I/O capabilities. In various embodiments, some or all of the servers are interconnected in a full-mesh topology. In some usage scenarios, network communication to individual servers within the ES cluster uses a network protocol, such as a Spanning Tree Protocol (STP) or Rapid Spanning Tree Protocol (RSTP), to determine a loop-free topology for communications between clients and the servers. Overlaying a spanning tree on top of the full-mesh topology eliminates some of the connectivity of the full-mesh topology. Elimination of some of the connectivity of the full-mesh topology causes particular communications to take longer paths than necessary, increasing latency of the particular communications.

In some embodiments, an Optimized Spanning Tree Protocol (OSTP) is used with full-mesh topologies, such as full-mesh ES clusters. According to various embodiments, the optimized spanning tree protocol is used within a chassis of a single-chassis system, and/or between chassis of a multiple-chassis system. In various embodiments, the optimized spanning tree protocol enables low latency communication to all servers within an ES cluster by advantageously using the full-mesh connectivity within the ES cluster.

EXAMPLE EMBODIMENTS

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1) A system comprising:
a network having a full-mesh portion and an other portion;
wherein a spanning tree protocol controls, at least in part, forwarding within the network; and
wherein within the full-mesh portion, an optimized spanning tree protocol controls, at least in part, forwarding within the network.

EC2) The system of EC1 wherein the optimized spanning tree protocol comprises a selective forwarding state.

EC3) The system of EC2 wherein ports forming connections among the full-mesh portion of the network use the selective forwarding state.

EC4) A system comprising:
a network wherein forwarding is controlled, at least in part, by an optimized spanning tree protocol; and wherein, within a full-mesh portion of the network, and when the full-mesh portion is forwarding traffic using the optimized spanning tree protocol, ports forming connections within the full-mesh portion are in a selective forwarding state.

EC5) The system of EC4 wherein when a particular port not among the ports forming connections within the full-mesh portion is forwarding traffic, the particular port is in a forwarding state.

EC6) The system of EC4 wherein when a particular port not among the ports forming connections within the full-mesh portion is forwarding traffic, the particular port is not in the selective forwarding state.

EC7) A system comprising:
a network wherein forwarding is controlled, at least in part, by an optimized spanning tree protocol; and
wherein, in a full-mesh portion of the network, no ports forming connections within the full-mesh portion are, when the full-mesh portion is forwarding traffic using the optimized spanning tree protocol, in a blocked state.

EC8) The system of EC7 wherein the optimized spanning tree protocol comprises a selective forwarding state.

EC9) The system of EC8 wherein the ports forming connections within the full-mesh portion use the selective forwarding state.

EC10) A system comprising:
a network comprising a plurality of nodes wherein forwarding is controlled, at least in part, by an optimized spanning tree protocol; and
wherein, in a full-mesh portion of the network, packets are forwarded between any two of the nodes connected by the full-mesh portion in one hop.

EC11) The system of EC10 wherein the optimized spanning tree protocol comprises a selective forwarding state.

EC12) The system of EC11 wherein ports forming connections between the nodes connected by the full-mesh portion use the selective forwarding state.

EC13) A system comprising:
a network having a full-mesh portion and an other portion; and
wherein ports forming connections within the full-mesh portion are enabled, when forwarding traffic, to operate in a particular state, and ports in the other portion are not enabled, when forwarding traffic, to operate in the particular state.

EC14) The system of EC13 wherein the particular state is a selective forwarding state.

EC15) The system of EC13 wherein the particular state is a state of an optimized spanning tree protocol.

EC16) The system of EC13 wherein the particular state is a selective forwarding state of an optimized spanning tree protocol.

EC17) The system of any of EC2, EC4, EC8, EC11, or EC16 further comprising an ES cluster; and
wherein the ES cluster comprises a plurality of ES-based servers, and the full-mesh portion interconnects at least some of the plurality of servers of the ES cluster in a full mesh.

EC18) The system of EC17 wherein the at least some of the plurality of servers is at least three of the servers.

EC19) The system of EC17 wherein each of the at least some of the servers comprises a plurality of respective ports; and
wherein the full mesh is instantiated among particular ports of the respective ports of the at least some of the servers.

EC20) The system of EC19 wherein a type of each of the respective ports is selected from the group consisting of external, internal, regular, and STP edge.

EC21) The system of EC19 wherein the particular ports are of the internal type.

EC22) The system of EC19 wherein the particular ports exchange messages to, at least in part, establish presence of the full mesh.

EC23) The system of EC22 wherein the messages comprise a set of neighbor IDs, each of the neighbor IDs identifying one of the servers.

EC24) The system of EC23 wherein the neighbor IDs are MAC addresses.

EC25) The system of EC22 wherein the messages are OSTP hello messages.

EC26) The system of EC22 wherein the presence of the full mesh is, at least in part, established by a particular one of the at least some of the servers when a plurality of the messages received by the particular server indicate a set of neighbors of the particular server all have each one of the set of neighbors as a neighbor.

EC27) The system of EC26 wherein the set of neighbors comprises at least three of the servers.

EC28) The system of EC26 wherein subsequent to establishing the presence of the full mesh, each of the particular ports is enabled to use the optimized spanning tree protocol.

EC29) The system of EC26 wherein subsequent to establishing the presence of the full mesh, each of the particular ports is enabled to be in the selective forwarding state.

EC30) The system of EC29 wherein subsequent to establishing the presence of the full mesh, each of the particular ports is enabled to be in a delay state prior to being enabled to be in the selective forwarding state.

EC31) The system of EC26 wherein the messages further comprise a state indicating the establishment of the presence of the full mesh, and subsequent to establishing the presence of the full mesh, a plurality of the messages sent by the particular server have the state indicating the establishment of the presence of the full mesh.

EC32) The system of EC31 wherein the full mesh is determined to be valid by the particular server when a plurality of the messages received by the particular server from each one of the neighbors in the set of neighbors all have the state indicating the establishment of the presence of the full mesh.

EC33) The system of EC32 wherein subsequent to determining validity of the full mesh, each of the particular ports is enabled to use the optimized spanning tree protocol.

EC34) The system of EC32 wherein subsequent to determining validity of the full mesh, each of the particular ports is enabled to be in the selective forwarding state.

EC35) The system of EC34 wherein subsequent to determining validity of the full mesh, each of the particular ports is enabled to be in a delay state prior to being enabled to be in the selective forwarding state.

EC36) A method comprising:
identifying a set of nodes in a network connected by a full-mesh portion of the network; and
placing ports of the nodes that form connections within the full-mesh portion of the network in a selective forwarding state.

EC37) The method of EC36 wherein an ES cluster comprises a plurality of ES-based servers, and the set of nodes comprises at least some of the ES-based servers.

EC38) The method of EC36 wherein an ES cluster comprises a plurality of ES-based servers, and the set of nodes is the plurality of ES-based servers.

EC39) A computer readable medium having a set of instructions stored therein that when executed by a processing element causes the processing element to perform functions comprising:

receiving, by a particular node of a plurality of nodes in a network, full mesh topology discovery packets from at least some of neighboring nodes of the plurality of nodes;

determining, at least in part from the receiving, a subset of the neighboring nodes having full-mesh connectivity; and placing, in response to the determining, one or more of a plurality of ports of the particular node in a selective forwarding state.

EC40) The method of EC39 wherein the full mesh topology discovery packets are OSTP hello messages.

EC41) The method of EC39 further comprising sending, from the particular node, full mesh topology discovery packets to the neighboring nodes.

EC42) The method of EC39 wherein the one or more ports are among the plurality of ports connecting to the neighboring nodes.

EC43) The method of EC39 wherein the full mesh topology discovery packets comprise a list of neighbor IDs, each of the neighbors IDs identifying one of the neighboring nodes.

EC44) The method of EC43 wherein the full mesh topology discovery packets further comprise a state indicating that the determining has determined the subset of the neighboring nodes having full-mesh connectivity.

EC45) The method of EC39 wherein the full mesh topology discovery packets comprise a list of neighbor IDs, each of the neighbors IDs identifying one of the plurality of nodes.

EC46) A method comprising:

clustering a plurality fabric-backplane enterprise servers into a full-mesh topology, the plurality being a full-mesh enterprise server cluster;

for each port of the full-mesh enterprise server cluster, identifying the type of the port as being a particular one of the set of port types including internal port, external port, and edge port, the external port and edge port types being non-internal ports of the full-mesh enterprise server cluster;

within the full-mesh enterprise server cluster, for each VLAN, forwarding packets received from non-internal ports to all ports of the VLAN; and within the full-mesh enterprise server cluster, for each VLAN, forwarding packets received from internal ports to all non-internal ports of the VLAN.

EC47) The method of EC46 wherein each internal port is a fabric-backplane enterprise server port that is directly connected to another fabric-backplane enterprise server.

EC48) The method of EC46 wherein each external port is a fabric-backplane enterprise server port that is connected to a switch external to the full-mesh enterprise server cluster.

EC49) The method of EC46 wherein each external port is a fabric-backplane enterprise server port that is connected to a device external to the full-mesh enterprise server cluster.

EC50) The method of EC46 wherein each edge port is a fabric-backplane enterprise server port that is connected to a server that is not a fabric-backplane enterprise server.

Enterprise Server System

FIG. 1A illustrates System 100A, a conceptual representation of an embodiment of an ES system. The system includes a particular ES chassis embodiment, ES1 110A, which is coupled to various other systems, including FC Storage Network 106, Generic Packet Network 107, and Ethernet Storage Network 108. FC Storage Network 106 provides mass storage via a collection of disks organized, for example, as a SAN. Generic Packet Network 107 conceptually includes arbitrary combinations of Local Area Network (LAN), Metro Area Network (MAN), and Wide Area Network (WAN) networks and typically includes Ethernet and Ethernet derivative links for coupling to Internet 101, an arbitrary number and arrangement of Client machines or servers, represented as Client 102 and Client 103, as well as an arbitrary number and arrangement of Personal Computers (PCs) or Workstations, represented as PC 104 and PC 105. Ethernet Storage Network 108 provides mass storage via a collection of disks organized in a Network Attached Storage (NAS) or iSCSI fashion.

ES1 110A includes a central I/O SFM (SFM 180) providing a switch fabric dataplane coupling for FCMs 120, NMs 130, SCMs 140, PMMs 150 (also known as Application Processor Modules), and OLBs 160, also known as AppLication Modules (ALMs). Cell-based communication is carried out over the switch fabric dataplane between the aforementioned elements coupled to it. In other words, the fabric functions as a cell-based switch. FCMs 120 include Fibre Channel Interfaces (FCIs) for coupling to FC standard storage devices and networks (such as SANs). NMs 130 include interfaces to standard network infrastructures. PMMs 150 include compute elements for execution of Application, Driver, and OS processes, via SMP clusters illustrated conceptually as SMP 151. A configurable Coherency Switch Fabric and Interconnect (CSFI 170) is included for partitioning or combining the CPU and Randomly Accessible read/write Memory (RAM) resources of PMMs 150. OLBs 160 include compute elements for execution of service processes, via various service acceleration modules. Service acceleration modules include SLB accelerator 161, SSL accelerator 162, and XML accelerator 163. SCMs 140 include compute elements for providing system management, controlplane (L2/L3 bridging and routing, for example), and load balancing processing for SFM 180 and the elements coupled to it. PMMs 150 also include FCIs for coupling to mass storage systems, such as Optional Local Disks 111-112, or SAN systems including mass storage.

In operation, Application, Driver, and OS processes are executed on PMMs 150 via CPU and RAM elements included in SMP 151. At least some of the data consumed and produced by the processes is exchanged in packets formatted as cells for communication on SFM 180. The data may include network data exchanged with Generic Packet Network 107 via NMs 130, and storage data exchanged with Ethernet Storage Network 108 via NMs 130 or FC Storage Network 106 via FCMs 120. The data may also include service data exchanged with OLBs 160 and SCMs 140, and other Application, Driver, or OS data exchanged with other elements of PMMs 150.

Data communicated on SFM 180 is not limited to data exchanged with PMMs 150, but may also include data communicated between any of the modules (or fabric clients) coupled to the fabric. For example, one NM may forward packets to itself or to another NM via the fabric. An NM may also exchange packets with an OLB for processing via the fabric. SCMs 140 may also exchange configuration and forwarding update information with VIOCs via VIOC Control Protocol (VIOC-CP) packets via the fabric. In some embodiments, SCMs 140 may also exchange selected system management, controlplane, and load balancing information with all modules coupled to the fabric via in-band packets communicated on the fabric.

In one embodiment, in conjunction with the VNIC functionality mentioned previously, a modified Ethernet Driver provides the illusion of local NIC functionality to Application, Driver, and OS processes locally executing on any of SCMs 140, PMMs 150, and OLBs 160. The NIC functionality can be configured to either appear to be coupled to a switch coupled to other NICs or appear to be coupled directly to one of the networking interfaces included on NMs 130. In another embodiment, this technique may be used to access networked storage devices (i.e., NAS subsystems) via the NMs 130.

As illustrated conceptually, SFM 180 includes a redundant pair of fabrics, with one of the pair typically configured as a Primary Fabric, while the other fabric is typically configured as a Redundant Fabric. SCM-Fabric coupling 149 represents two fabric dataplane couplings, a first Primary Coupling between a Primary SCM of SCMs 140 and the Primary Fabric, and a Redundant Coupling between a Redundant SCM of SCMs 140 and the Redundant Fabric. In one mode of operation, all dataplane traffic is carried on the Primary Fabric, managed by the Primary SCM, while the Redundant Fabric and the Redundant SCM are maintained in a hot-standby mode.

Further dataplane couplings to SFM 180 are illustrated conceptually as FCM-Fabric coupling 129, NM-Fabric coupling 139, PMM-Fabric coupling 159, and OLB-Fabric coupling 169. In FIG. 1, each coupling is abstractly portrayed as a single line between each group of modules and the switch fabric. It will be understood that for the FCM, NM, and OLB modules, each module instance has a Primary Fabric coupling and a Redundant Fabric coupling. For the PMM, each PMM instance has two Primary Fabric couplings and two Redundant Fabric couplings.

All of the modules coupled to SFM 180 (FCMs 120, NMs 130, SCMs 140, PMMs 150, and OLBs 160) include fabric interface communication units for exchanging data as cells on the fabric.

In an illustrative embodiment, the components of ES1 110A are included on a plurality of pluggable modules adapted for insertion into and removal from a backplane while the server is powered-up and operational (although software intervention to cleanly shut down or start up various processes or functions may be required). The backplane forms portions of FCM-Fabric coupling 129, NM-Fabric coupling 139, CSFI-PMM coupling 179, PMM-Fabric coupling 159, and OLB-Fabric coupling 169. The Primary Fabric of SFM 180 and the associated Primary SCM of SCMs 140 are included on pluggable module Primary SIM as illustrated by SIMs 190. Similarly, the Redundant Fabric of SFM 180 and the associated Redundant SCM of SCMs 140 are included on pluggable module Redundant SIM of SIMs 190. All of the modules of FCMs 120, NMs 130, PMMs 150, and OLBs 160 are also configured as pluggable modules adapted for operation with the backplane.

Each PMM of PMMs 150 is physically-partitionable, i.e. configurable into one or more physical partitions. The physical partitioning of PMMs 150 and related modes of CSFI 170 are configured under program control. For example, PMMs 150 may be configured as a single SMP complex in conjunction with CSFI 170. The result is a first example of a physical partition. In a second example, each PMM of PMMs 150 may instead be configured individually as an independent SMP complex, resulting in a plurality of physical partitions, one for each PMM. In a third example, each PMM of PMMs 150 may instead be configured as a pair of SMP complexes, resulting in two physical partitions per PMM. In various embodiments, CSFI 170 may be implemented as any combination of simple interconnect, coherency logic, and switching logic, operating in conjunction with any combination of interconnect and logic included on PMMs 150.

ES1 110A, as illustrated, is representative of a number of embodiments configured with various Modules to provide differing amounts of storage and network interface capability (connectivity and bandwidth), as well as differing levels of compute capability (cycles and memory). Typically, each embodiment includes at least a redundant pair of Switch Fabrics and associated System Intelligence Modules (for communication between Modules), at least one Processor Memory Module (for execution of Application, Driver, and OS processes), and at least one Network Module (for communication with external agents). Some embodiments may optionally further include any combination of additional Modules to provide additional interface and compute capability, up to the physical limits of the particular implementation. For example, additional Network Modules may be included in an embodiment to provide additional network bandwidth or connectivity. One or more Fibre Channel Modules may be included in an embodiment to provide additional storage bandwidth or connectivity. Additional Processor Memory Modules may be included to provide additional compute cycles or memory. One or more Offload Modules may be included to provide additional service compute cycles or memory, and these Offload Modules may each be individually configured with any combination of SLB, SSL, and XML accelerators.

In the embodiments represented by ES1 110A, communication between the Modules via SFM 180 is independent of the manner and arrangement of the Modules. All of the Modules communicate as peers on SFM 180 and interface to the fabric in a similar manner.

System 100A is also representative of a variety of system embodiments, for example, differing in the number, type, and arrangement of storage and network systems coupled to ES1 110A. For example, any combination of Optional Local Disks 111-112 may be included. Generic Packet Network 107 may include any combination of LAN, MAN, or WAN elements. FCMs 120 may be coupled to a single SAN, or a plurality of SANs. NMs 130 may be coupled to a plurality of networks or storage systems. Couplings between ES1 110A and other systems is limited only by the number and type of interfaces and physical couplings available according to implementation.

Figure 1B:
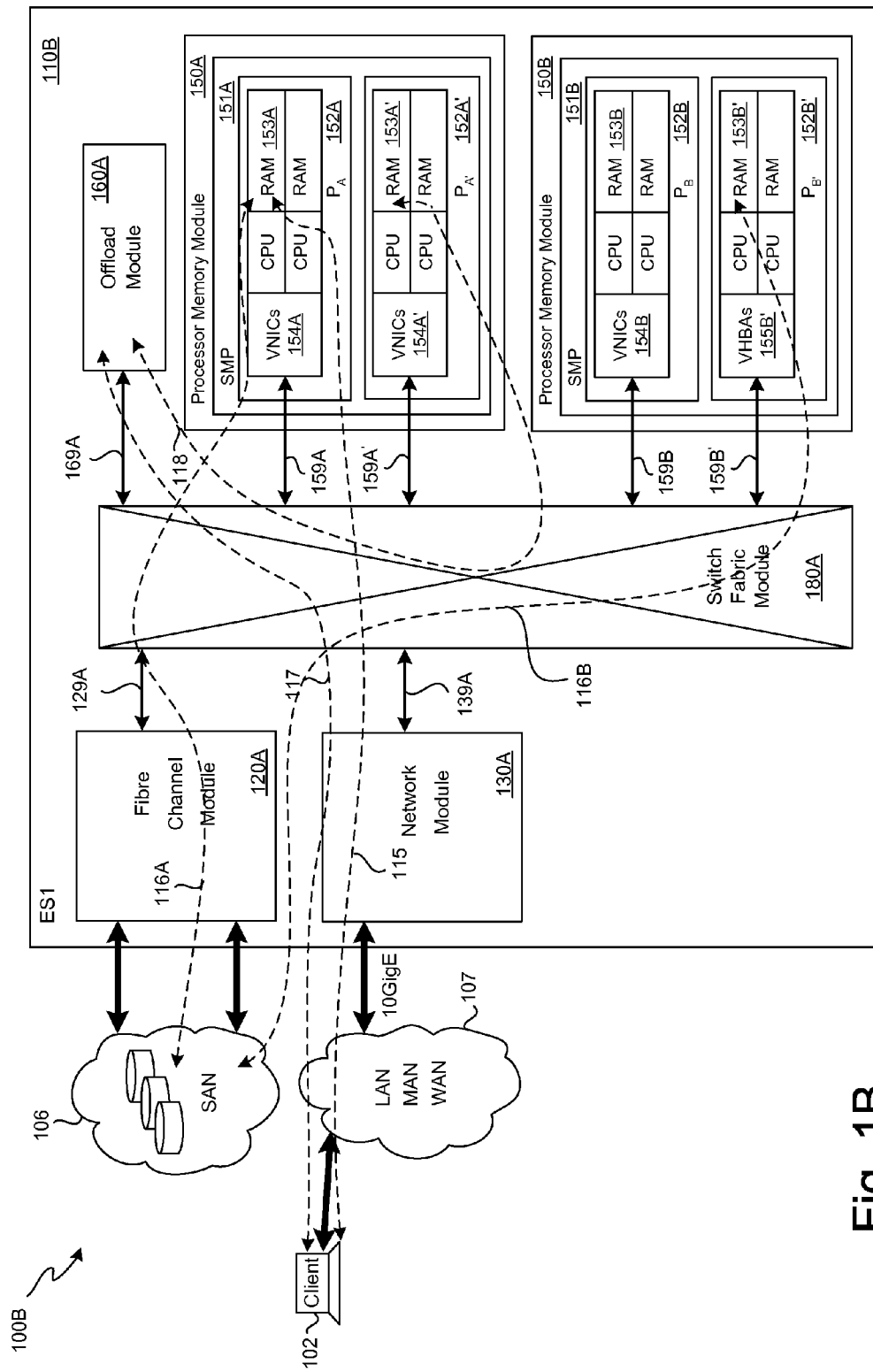
FIG. 1B illustrates a conceptual representation of selected details of data transfer in an embodiment of an ES system.

FIG. 1B illustrates System 100B, a conceptual representation of selected details of data transfer in an embodiment of an ES system. An ES chassis embodiment, illustrated as ES1 110B, is coupled to FC Storage Network 106 and Ethernet Network 107, as described elsewhere herein. In the illustrated embodiment, various modules of each type (FCM 120A, NM 130A, PMM 150A, PMM 150B, and OLB 160A) are coupled to Primary Switch Fabric Module 180A, via FCM-Fabric coupling 129A, NM-Fabric coupling 139A, PMM-Fabric couplings 159A/159A' and 159B/159B', and OLB-Fabric coupling 169A, respectively. FCM 120A provides interfaces for storage network couplings (such as used for storage gateways), including a coupling for FC Storage Network 106. NM 130A provides interfaces for network couplings, including a coupling for Ethernet Network 107, coupled in turn to Client 102. In this illustrative scenario, PMM 150A is configured as a first and a second physical partition. The first physical partition includes SMP Portion $P_A$ 152A, having RAM 153A, and is coupled by PMM-Fabric coupling 159A (via VNICs 154A) to the fabric dataplane. The second physical partition includes SMP Portion $P_{A'}$ 152A', having RAM 153A', and is coupled by PMM-Fabric coupling 159A' (via VNICs 154A') to the fabric dataplane. PMM 150B is similarly configured as two physical partitions (SMP Portion $P_B$ 152B and SMP Portion $P_{B'}$ 152B'), having respective fabric couplings 159B/159B' implemented via VNICs 154B and VHBAs 155B', respectively. Note: several elements have been omitted from the figure for clarity, including the SCMs, the Redundant Fabric, the CSFI, and optional SANs.

Several illustrative data transfer paths are shown, including Client-Server Data Exchange 115, Storage-Server Data Exchange 116A, Storage Gateway Data Exchange 116B, Client-Service Data Exchange 117, and Service Data Exchange 118. Each path illustrates the movement of data between two clients of the switch fabric. Consider now three embodiments, described from the perspective of these clients. In one embodiment, data is organized as packets transferred via a stateless connection-free (and unreliable) protocol. In another embodiment, data is organized as messages, and transferred via a connection-oriented reliable message protocol. In yet another embodiment, data is selectively organized as either packets or messages.

The underlying fabric transport process is transparent to the clients and external devices coupled to the system and to most of the host software processes on the PMMs and OLBs. To external network devices, each port of each NM acts as a switch port of a virtualized high-performance L2/L3 switch. In some embodiments, the switch has advanced VLAN and classification functionalities. The VLAN functionality provides for selectively coupling or isolating the network segments coupled to each switch port. Each segment associated with an NM port may have one or more external physical network devices as in any conventional network segment. The classification functionality provides for special forwarding treatments in accordance with a variety of attributes of the Ethernet frames received from external network devices on the ports of the NMs. Select software processes running on the PMMs and OLBs are provided the illusion that they are coupled via high-performance Ethernet network interfaces to dedicated ports of the VLAN-enabled switch. Connectivity between the different network segments may be flexibly and arbitrarily configured through VLAN management.

In systems having FCMs, a virtualized FC switch is similarly presented to external FC devices. Likewise, certain software processes running on the PMMs are provided the illusion they are coupled to the FC switch via high-performance FC interfaces. Multiple VLANs and multiple FC networks can simultaneously co-exist on top of the fabric transport infrastructure while being completely logically separate and secure.

The underlying fabric transport process is now briefly overviewed. The fabric supports the transparent transport of both packets and messages. Here, "packets" refers to conventional Ethernet frames sent via some connectionless protocol that does not have integral support for reliable delivery. The term "messages" refers to one or more data transfers of quasi-arbitrarily sized data blocks reliably delivered over a logical connection established between end-points. Packets are transported over the fabric using "fabric packets," while messages are transported over the fabric using "fabric messages." Both fabric packets and fabric messages make use of highly similar fabric frames. A fabric packet is comprised of a single fabric frame, sent over the fabric without any connection or reliable delivery support. In contrast, fabric messages are comprised of (potentially quite long) sequences of fabric frames, sent over the fabric using a connection-oriented reliable delivery protocol. Some of the fabric frames of a fabric message are for transfer of the message data blocks while other fabric frames are used for control to set up and take down connections and to implement reliable delivery (e.g., via handshake and re-delivery attempts).

Thus fabric messages require additional fabric frames for messaging control beyond the fabric frames required to transport the message data. Furthermore, the fabric frames of fabric messages require additional processing at the source and destination ends related to the management of reliable delivery, connections, and the fragmentation (segmentation) and reassembly of data blocks. Nevertheless, the transport over the fabric of individual fabric frames is essentially the same for both fabric messages and fabric packets. Since all sources and destinations on the fabric have support for processing fabric packets and fabric messages, those of ordinary skill in the art will understand that all of the data exchange illustrations below that describe the transport of packets using fabric packets are equally applicable to the transport of messages using fabric messages.

The Ethernet frames of the packets to be transported over the fabric may originate in external clients or devices coupled to the NM ports or from within the various processing modules. During processing by the NM or the VIOC, respectively, a fabric packet is formed to contain the data of each original Ethernet frame plus additional information to facilitate transport over the fabric. During the fabric packet formation, the protocol field (Ether-type) of the original Ethernet frame is examined. The fabric packet is generally labeled (tagged) in accordance with the Ether-type and other information found in the original packet. E.g., if the original Ethernet frame is an IP type frame, the fabric packet is identifiable as an "IP fabric packet." IP fabric packets are evaluated for L3 forwarding (a.k.a. IP forwarding) based upon their included destination IP address. Otherwise, non-IP fabric packets are evaluated for L2 forwarding based upon their included MAC destination address (MACDA). L2/L3 forwarding is overviewed next.

During the fabric packet formation a forwarding decision is made that determines a fabric destination address that is embedded in the fabric packet. The embedded fabric destination address controls how the fabric packet is delivered to destinations within the system. The fabric destination address includes a specification for an egress port of the switch fabric. When multiple sub-ports (corresponding to multiple L2 or L3 destination addresses) are associated with a single egress port, the fabric destination address will also include a fabric sub-address to specify a particular one of the sub-ports.

The fabric packet is subsequently cellified (segmented into cells) and presented to an ingress port of the switch fabric. Each cell includes the fabric destination address and the cell is transferred by the switch fabric to the egress port specified by the fabric destination address. After being received by the module coupled to the specified egress port, the cells are reformed into a representation of the original Ethernet frame prior to presentation to the destination. If the module at the egress port has multiple sub-ports, the module will use the included fabric sub-address to further direct the reformed Ethernet frame to the specified sub-port.

In L2 forwarding, the VLAN assignment of the network port or processing module from which the original Ethernet frame was sourced is also used with the MACDA in determination of the fabric destination address. The determination is by way of a lookup in an L2 Forwarding Information Base (L2 FIB). An L2 FIB is implemented for each VIOC and NM in the system using any combination of TCAM/SRAM structures and search engines, according to embodiment. The L2 forwarding decision is thus implemented completely within the module where the original Ethernet frame was sourced and the next fabric destination is the module most directly associated with the MACDA of the original Ethernet frame.

General L3 forwarding (i.e., to destinations beyond the IP sub-net of the source IP) requires access (on the same L2 sub-net as the source) to at least one gateway IP interface and associated L3 FIB. The number and location of gateway IP interfaces and L3 FIBs varies by embodiment. In a first L3 embodiment, a gateway IP interface and L3 FIB is implemented external to the system chassis. In the first L3 embodiment, there is no gateway IP interface or L3 FIB on any NM or VIOC and the system hardware does not provide any L3 forwarding assists. That is, the external gateway IP interface and L3 FIB are not aware of the fabric transport process and function conventionally to provide the Ethernet MACDA of the next hop. In a second L3 embodiment, at least one gateway IP interface is implemented via a media port (physical port) or pseudo-port (virtual port) somewhere on at least one NM and an L3 FIB is implemented within each NM having a gateway IP interface. In the second L3 embodiment, there is not a gateway IP interface or L3 FIB on any VIOC. The gateway IP interface is only visible from inside the chassis if implemented on a pseudo-port. The gateway IP interface is visible from inside and outside the chassis if implemented on a media port. Combinations of multiple gateway IP interfaces, some on media ports and others on pseudo-ports, are envisioned. In a third L3 embodiment, a gateway IP interface is implemented somewhere on at least one NM and for each VNIC, and an L3 FIB is implemented within each NM and VIOC. Gateway IP interfaces and L3 FIBs implemented within the chassis are fabric packet aware and assist L3 forwarding by providing the fabric destination address of the next hop.

In the second and third L3 embodiments, L3 FIB management processes maintain a master L3 FIB in the SCM and maintain coherency between all L3 FIBs in the chassis. When a non-master L3 FIB encounters a destination IP address that has no corresponding entry, the IP fabric packet undergoing the forwarding decision is forwarded as an "exception packet" to the controlplane process executing on the Primary SCM. The controlplane process determines the proper fabric address for the missing entry, propagates a new entry to all of the L3 FIBs, and forwards the IP fabric packet to the destination IP (or at least one hop closer) using the newly learned fabric address. (Fabric frames exist for a single cellified hop across the fabric between fabric source and fabric destination. In the above and the following it will be understood that when an IP fabric packet is "forwarded" via an indirection or hop via an gateway IP interface or the Primary SCM, the IP fabric packet is being re-instantiated into a new fabric frame for each traverse across the fabric.)

In accordance with the foregoing, depending upon embodiment and within which module an IP packet is first processed, an IP fabric packet may first undergo an indirection to an IP gateway interface, possibly on a different port or pseudo-port on the same or a different module or external to the system. All transport is by conventional Ethernet frames outside the chassis and by fabric frames within the chassis. Once at an IP gateway interface, the destination IP address of the original Ethernet frame is used to associatively access the L3 FIB and the lookup result is used to forward the IP packet to the IP destination (or at least one hop closer).

Those of ordinary skill in the art will understand that for IP packet transfers over the fabric, generally a gateway IP interface must be involved. In the following illustrated data exchanges, the paths are drawn for scenarios that do not require additional indirection. Nevertheless, it will be understood that if an IP packet is received at an interface that is neither the IP destination address or a gateway IP interface, then generally the corresponding data exchange path is modified by interposing an intermediate hop to a gateway IP interface. Furthermore, when an IP packet is received at a gateway IP interface, either directly or as part of an indirection from a non-gateway IP interface, in the relatively rare event that there is a miss in the associated L3 FIB, the corresponding data exchange path is modified by interposing an intermediate hop to the Primary SCM. As previously indicated, Primary SCM controlplane processing services the miss in the master L3 FIB and updates the L3 FIBs throughout the chassis. Once the miss is serviced, the Primary SCM forwards the IP packet toward the originally intended destination. Thus, while not a frequent occurrence, for some IP fabric packets two intermediate hops are interposed in the data exchange paths: a first intermediate hop to a gateway IP interface and a second intermediate hop to the Primary SCM.

In at least L3 forwarding, the classification functionality of the NMs facilitates more sophisticated forwarding decisions, special data manipulation, and other data treatments, to be optionally performed as a function of additional attributes of the network data traffic encountered. In one particular example, the fabric destination address for IP fabric packets is at least in part determined by the recognition of particular service requests (and the lack thereof) embedded in the data traffic. More specifically, the service request recognition takes the form of recognizing particular Transmission Control Protocol/Internet Protocol (TCP/IP) destination ports corresponding to particular applications. The L2 and L3 FIBs are also updated dynamically, both in response to changes in the network configuration and optionally for dynamic performance optimization, such as to achieve load balancing among the processing resources of the system.

For the sake of clarity in the below initial expositions for each of the data exchanges illustrated by FIGS. 1B and 2, the foregoing details of the transport process just described will be understood to apply, but will not be repeated. It will also be understood that even though the data exchanges are described from a flattened perspective that includes operations by the clients, the modules, and the switch fabric, the underlying above described fabric transport process (and the associated management of the L2 and L3 FIBs) remains transparent to the external clients, external devices, and internal host software processes. These clients, devices and host software processes are only aware of packets and messages (and not the fabric packets or fabric messages).

The data exchanges will be described in terms of more than one type of packet. References to packet transmission, packets originating from the client, incoming packets, received packets, reassembled packets, or simply packets, are references to Ethernet frames. It will be understood that all such Ethernet frames are transported across the fabric via the process of fabric packet encapsulation, cellification, switch fabric traversal, and reassembly. References to augmented packets or cellified packets are references to fabric packets. References to cells or cellified packets being forwarded refers to the providing of fabric-addressed cells to the switch fabric for transfer by the switch fabric to the module coupled to the switch fabric egress port specified by the fabric address.

In each data exchange description, generic exchanges are purposefully not explicitly characterized as being of the IP or non-IP type. It will be understood that each of these data exchanges is generally equally applicable to the exchange of IP fabric packets or non-IP fabric packets. If IP packets are being exchanged, then the forwarding is understood to be L3 forwarding. Otherwise, the forwarding is understood to be L2 forwarding Client-Server Data Exchange 115 includes packet transmission from Client 102 via Ethernet Network 107 to NM 130A. Since the system may in part be providing the functionality of an L2/L3 switch for any of many network segments, packets received in close time proximity by NM 130A may be for any of multiple destinations both internal and external to the system. The incoming packets are classified, formed into fabric packets, subjected to a forwarding decision to determine a fabric address, and selectively provided as cells to Primary Switch Fabric Module 180A via a fabric ingress port associated with NM-Fabric coupling 139A. Based in part on the classification, NM 130A addresses the cells to PMM 150A, and more specifically to SMP Portion $P_A$ 152A, as a result of the forwarding decision identifying the fabric egress port associated with PMM-Fabric coupling 159A as the destination fabric addresses for the cells. Primary Switch Fabric Module 180A then transfers the cells to the fabric egress port associated with PMM-Fabric coupling 159A. SMP Portion $P_A$ 152A receives the cells and reassembles them into received packets corresponding to the packets originating from Client 102. The received packets are formed directly in RAM 153A, typically via DMA write data transfers. Return packets follow the flow in reverse, typically beginning with DMA read transfers from RAM 153A. Although Client-Server Data Exchange 115 has been described from the perspective of packets "originating" from Client 102 and return traffic flowing in reverse, this is only for illustrative purposes. The flow from Client 102 to SMP Portion $P_A$ 152A is entirely independent of the flow in the other direction.

Not all packets received from Client 102 via Ethernet Network 107 are destined to SMP Portion $P_A$ 152A. For example, Client-Service Data Exchange 117 illustrates cellified packets selectively forwarded by NM 130A toward OLB 160A via NM-Fabric coupling 139A, Primary Switch Fabric Module 180A, and OLB-Fabric coupling 169A. Based in part on the classification, packets from Client 102 are determined to require transfer to OLB 160A (instead of other fabric clients, such as SMP Portion $P_A$ 152A as in Client-Server Data Exchange 115). NM 130A addresses the corresponding cells to OLB 160A and executes a forwarding decision identifying the fabric egress port associated with OLB-Fabric coupling 169A as the fabric destination address for the cells. Primary Switch Fabric Module 180A then transfers the cells to the fabric egress port associated with OLB-Fabric coupling 169A. OLB 160A receives the cells and reassembles them into received packets directly into a RAM local to the OLB. Return packets follow the flow in reverse.

In some embodiments, messages are used to implement FC storage transactions. Storage-Server Data Exchange 116A includes establishing a reliable end-to-end logical connection, directly reading message data from RAM 153A (included in SMP Portion $P_A$ 152A), fragmenting (as required) the message data into fabric frames, and providing corresponding cells addressed to FCM 120A via PMM-Fabric coupling 159A. As a result of a forwarding decision, the cell destination addresses specify the fabric egress port associated with FCM-Fabric coupling 129A. For each fabric frame sent, the cells are transferred, received, and reassembled in a manner similar to that described for fabric packets in conjunction with Client-Service Data Exchange 117, via functions implemented in VNICs 154A. The storage transactions are provided via a storage network coupling to at least one storage device of external Storage Network 106. In some embodiments, if more than one storage network and associated storage network coupling is associated with FCM 120A, the particular storage network coupling is specified via a fabric sub-address portion of the cell destination address. Returning storage transaction responses follow the flow in reverse.

In some embodiments, messages are used to implement storage gateway transactions, including communications with FC-compatible storage devices. Storage Gateway Data Exchange 116B includes operating an end-to-end logical connection (via a reliable transmission protocol, for example), directly reading storage information (such as iSCSI commands and data) from RAM 153B' (included in $P_{B'}$ 152B'), fragmenting (as required) the information into fabric frames, and providing corresponding cells addressed to FCM 120A via PMM-Fabric coupling 159B'. As a result of a forwarding decision, the cell destination addresses specify the fabric egress port associated with FCM-Fabric coupling 129A. For each fabric frame sent, the cells are transferred, received, and reassembled in a manner similar to that described for fabric packets in conjunction with Client-Service Data Exchange 117, via functions implemented in VHBAs 155B'. The functions may include any combination of bandwidth control, management, allocation, and partitioning, according to various embodiments. The storage information is provided via a storage network coupling to at least one storage device of external Storage Network 106. In some embodiments, if more than one storage network and associated storage network coupling is associated with FCM 120A, the particular storage network coupling is specified via a fabric sub-address portion of the cell destination address. Returning storage information follows the flow in reverse.

Service Data Exchange 118 is similar to Client-Service Data Exchange 117. Packet data is read from RAM 153A' (included in SMP Portion $P_{A'}$ 152A'), and cells are forwarded to OLB 160A by a forwarding decision specifying the fabric egress port associated with OLB-Fabric coupling 169A as the cell destination addresses. The packets exchanged by Client-Server Data Exchange 115, and Client-Service Data Exchange 117, and Service Data Exchange 118, are typically but not necessarily IP packets.

In some embodiments, Data Exchanges 115-118 are overlapped or partially concurrent with each other. For example, cells corresponding to a portion of Client-Server Data Exchange 115 traffic may be intermixed with cells relating to Client-Service Data Exchange 117 traffic, as the cells from both data exchanges are coupled via NM-Fabric coupling 139A to the fabric. However, each cell includes sufficient information in the corresponding fabric destination address and other information to specify the proper operation. For example, at NM-Fabric coupling 139A, cells of Client-Server Data Exchange 115 are forwarded to SMP Portion $P_A$ 152A by a first forwarding decision specifying the fabric egress port associated with PMM-Fabric coupling 159A, while cells of Client-Service Data Exchange 117 are forwarded to OLB 160A by a second forwarding decision specifying the fabric egress port associated with OLB-Fabric coupling 169A. Similarly, cells from Client-Service Data Exchange 117 and Service Data Exchange 118 may be intermixed on OLB-Fabric coupling 169A, because sub-port destination address and other information in the cells enable proper processing. In one embodiment, a portion of the sub-port destination address is used to associate packets with a respective input queue within the destination module.

In some embodiments, the termini of Data Exchanges are located in RAM that is directly accessible by one or more processing elements. For example, Service Data Exchange 118 includes a first terminus in RAM 153A', and a second terminus in a RAM within OLB 160A. In typical embodiments, packet data from the RAMs are read and written by DMA logic units included in each of the respective modules. Conceptually, data is streamed from a source RAM as packets, cellified and provided to the fabric, transferred to the egress port as specified by the cells, reassembled, and stored into a destination RAM in packet form. These operations, in some embodiments, are fully overlapped, or pipelined, so that data from a first cell of a packet may be stored into the destination RAM while data from a following cell of the same source packet is being read from the source RAM.

Loop Breaking in Full-Mesh Topologies

While techniques described in this and subsequent sections use OSTP-enabled physical partitions in an ES chassis to implement the ES-based servers of the examples herein, the techniques are applicable to any OSTP-enabled full-mesh portion of a network. In other embodiments, some or all of the ES-based servers of the examples herein may be replaced by other OSTP-enabled devices on the network, including: SMP complexes, blade servers, and switches, in any combination. For example, for some of the techniques described herein, a multi-ported OSTP-enabled switch is envisioned to behave in substantially a same manner as the OSTP-enabled ES-based servers used as examples herein.

Low latency and loop-free communications are often important and simultaneous requirements in networked deployments of Enterprise Servers. Low latency can be achieved by configuring multiple ES-based serves in a full-mesh configuration such that every ES-based server is one hop from every other ES-based server. Full-mesh configurations provide the potential for one-hop latency for communications among the ES-based servers within the full-mesh. External nodes with one-hop latency to any ES-server of the full-mesh thus potentially enjoy at most two-hop latency to any other of the ES-based servers of the full-mesh. Standard spanning tree protocols (standard STP) can be used to ensure loop-free communication in full-mesh ES configurations. By "standard STP" we mean both the original Spanning Tree Protocol (STP) and the later Rapid Spanning Tree Protocol (RSTP). Unfortunately, the application of standard STP in full-mesh ES configurations often increases latency because it prevents traffic from taking a shortest path from source to destination. More specifically, some ES-based servers in a full-mesh configuration undesirably take two or more hops to reach each other because a direct physical link of the full-mesh configuration is blocked by the standard STP. Additionally, client communications from outside the full-mesh to one of the ES-based servers are similarly sometimes undesirably forwarded by the standard STP through more than two of the ES-based servers.

Figure 2:
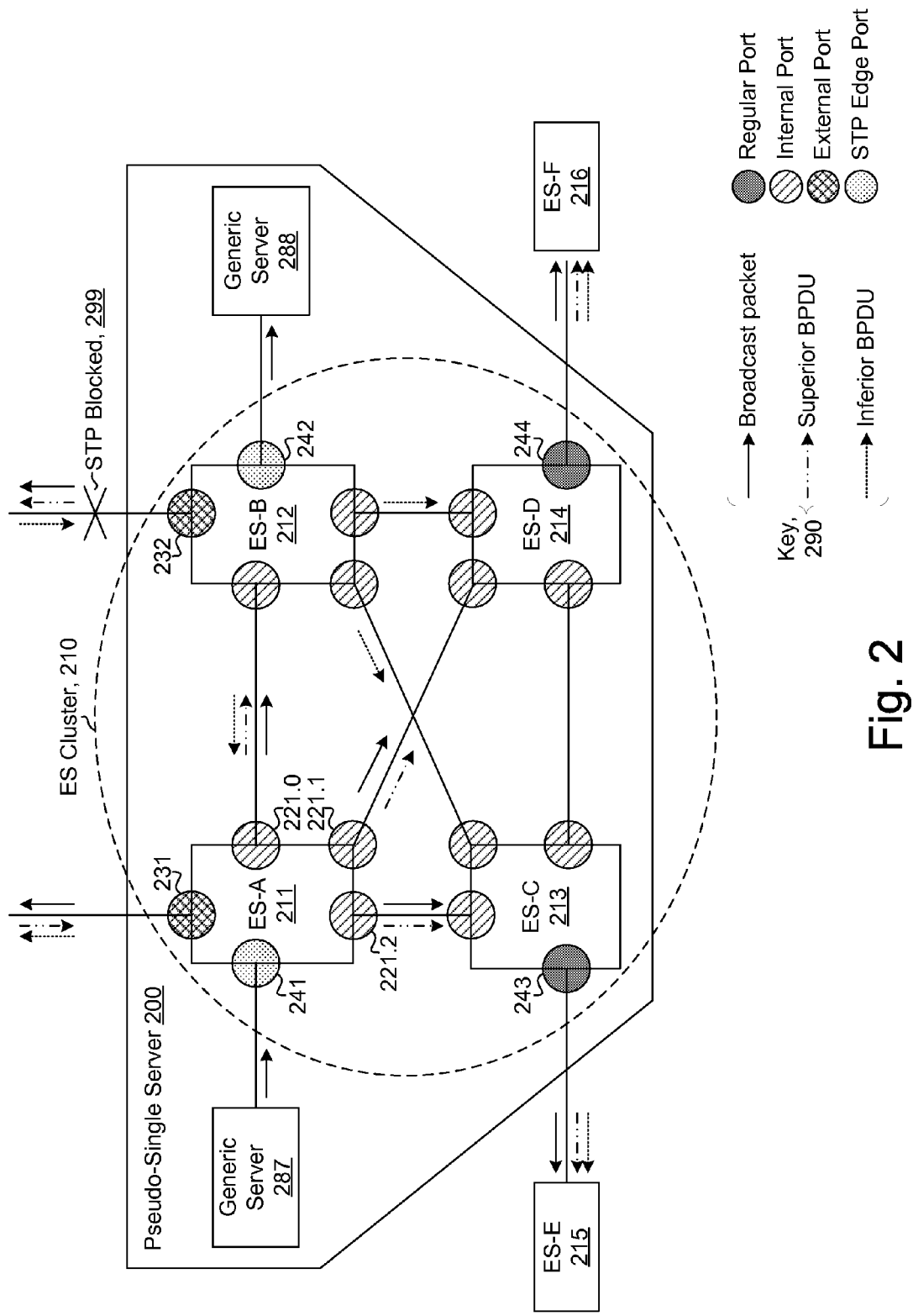
FIG. 2 illustrates selected details of an example of a loop-free, low-latency, high-throughput, full-mesh ES Cluster.

To minimize traffic latency in networks that comprise a full-mesh topology, such as ES cluster 210 as illustrated in FIG. 2, an Optimized Spanning Tree Protocol (OSTP) is used. The OSTP enables traffic traversing a full-mesh ES network to take a shortest path from source to destination through available use of all physical links of a full-mesh portion of the network. The OSTP is easily configured and is compatible with external networks (the portion of the network outside of the full-mesh portion) where a standard STP is enabled. In at least some ways, an ES cluster using the OSTP appears like a single resource to other nodes sharing a common LAN segment. According to various embodiments, the OSTP is configured to operate on one or more of: a per VLAN basis; a port basis; an ES server basis; and an ES cluster basis.

Figure 4:
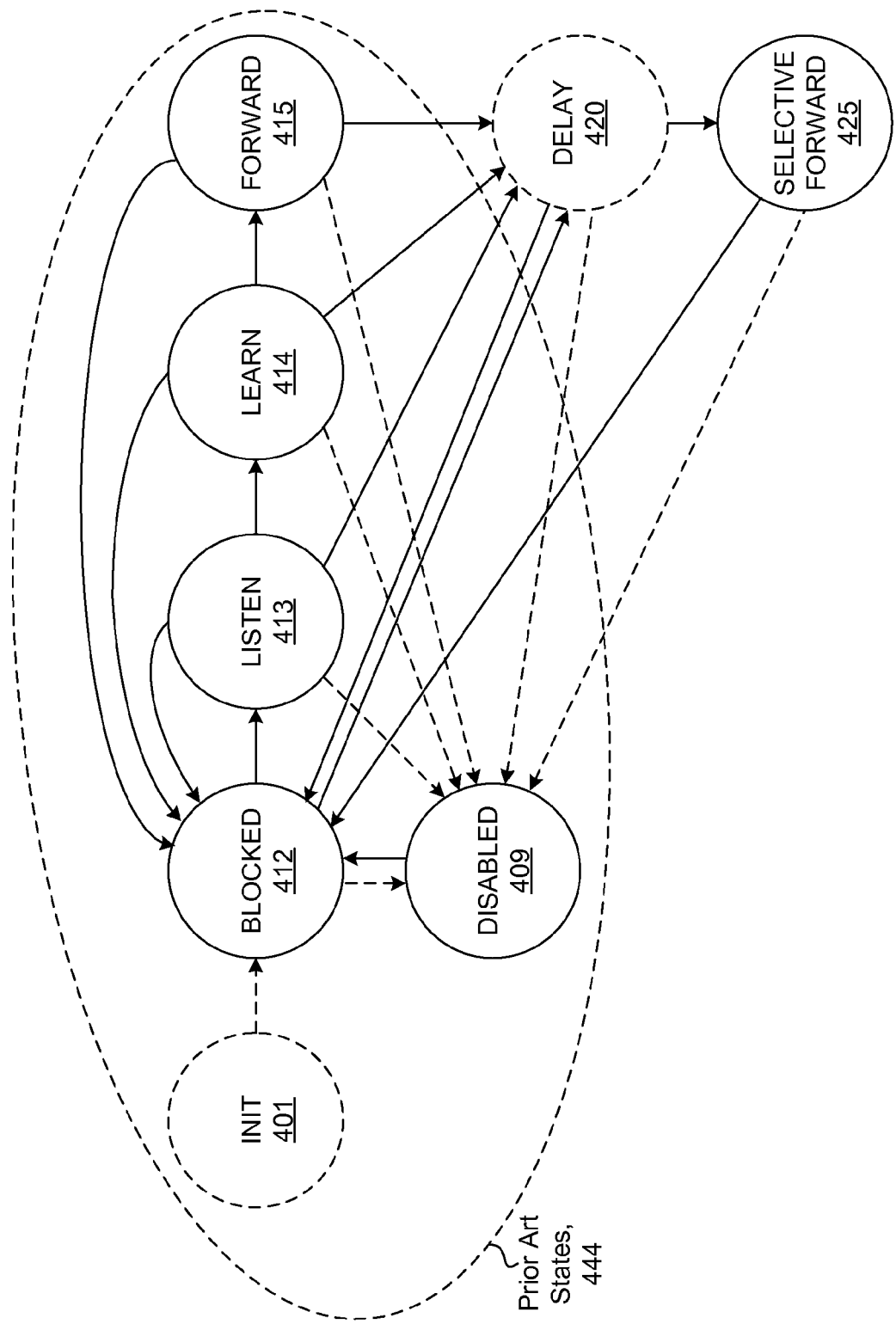
FIG. 4 illustrates selected details of an embodiment of a state diagram for an optimized spanning tree protocol.

As illustrated in FIG. 4, a port using a standard STP (such as either STP or RSTP) can be in an initialization state 401 or any of five post-initialization states: blocked state ("BLOCKED") 412, listening state ("LISTEN") 413, learning state ("LEARN") 414, forwarding state ("FORWARD") 415, and disabled state ("DISABLED") 409, collectively prior art states 444. The port begins (post initialization) in blocked state 412, and transitions through listening state 413 and learning state 414 to arrive at a forwarding state 415, where traffic is forwarded through the port. Any of the states is enabled to transition to the blocked state, such as when the standard STP determines that the port should not be forwarding traffic. Dashed lines are used in FIG. 4 to illustrate transitions to disabled state 409 since, in some embodiments, transitions to disabled state 409 are performed administratively. In various embodiments, any state is enabled to transition to disabled state 409, such as when the use of a spanning tree protocol is disabled on the port.

Continuing in FIG. 4, particular ports that are determined to be part of a full-mesh topology and/or are enabled to operate in an OSTP mode are enabled to be in an additional state, selective forwarding state ("SELECTIVE FORWARD") 425. The significance of the selective forwarding state is that a port in this state does not forward traffic to other ports that are part of a same full-mesh topology. A port in the selective forwarding state does forward traffic to ports that are not part of a same full-mesh topology.

In some embodiments, due to topology changes (such as determining presence of or loss of a full-mesh topology), a state of one or more of the particular ports is enabled to transition dynamically between at least some of the other states and the selective forwarding state. According to various embodiments, one or more additional delay states are used to delay one or more of: a transition from one of the other post-initialization states to the selective forwarding state (as illustrated by optional delay state ("DELAY") 420); and a transition from the selective forwarding state to a plurality of the other post-initialization states (not illustrated in FIG. 4). As illustrated in FIG. 4, all other post-initialization states are enabled to transition to selective forwarding state 425. In other embodiments, only forwarding state 415 is enabled to transition (optionally via a delay state) to selective forwarding state 425. As illustrated in FIG. 4, transitions from selective forwarding state 425 are either to disabled state 409 or to blocked state 412. In some embodiments, changes to network topology are not tracked while a port is in selective forwarding state 425. In other embodiments, changes to network topology are tracked while a port is in selective forwarding state 425. For example, a hidden STP state, indicating an STP state a port would have if it was not in selective forwarding state 425, is tracked. Accordingly, in some embodiments (not illustrated in FIG. 4), selective forwarding state 425 is enabled to transition (optionally via a delay state) to forwarding state 415, such as due to loss of a full-mesh topology.

Loop Breaking in Full-Mesh Topologies: Packet Forwarding

Achieving low-latency packet forwarding using the OSTP is further described with respect to pseudo-single server 200 of FIG. 2. Pseudo-single server 200 includes ES cluster 210, a portion of the pseudo-single server that is connected in a full-mesh topology. In the example of FIG. 2, ES cluster 210 includes four individual ES chassis (ES-A 211, ES-B 212, ES-C 213, and ES-D 214). As illustrated, each ES chassis is configured as a respective single server. According to various more general embodiments, one or more of the ES chassis are provisioned to host more than one of the ES-based servers participating in the full-mesh topology. For example, the resources of one of the ES chassis are partitioned, such as by being at least in part physically partitioned, into multiple ES-based servers, and one or more of the multiple ES-based servers independently participate in the full-mesh topology. The respective servers are connected in a full-mesh topology by a set of internal ports, such as internal ports 221.0, 221.1, 221.2 of ES-A 211. According to various embodiments, a number of ES-based servers in an ES cluster varies either statically or dynamically. In some embodiments and in some usage scenarios, all ES-based servers in an ES cluster are configured to use an OSTP rather than a standard STP. Pseudo-single server 200 further optionally includes other ES chassis (not illustrated in FIG. 2) and/or non-ES servers (such as generic servers 287 and 288) at nodes not directly accessible from outside the pseudo-single server. Pseudo-single server 200 is optionally coupled to other ES chassis, such as leaf ES chassis ES-E 215 and ES-F 216.

In FIG. 2, different port types/configurations are represented by different patterned circles, and different transfer types are represented by different patterned arrow types (as described by key 290 in the lower right of FIG. 2). (In some embodiments, some or all ports are of a same physical type, and a port configuration determines, at least in part, an effective port type.) Four types of ports are illustrated in FIG. 2: regular ports via a shaded pattern; internal ports via a diagonal pattern; external ports via a hash pattern; and STP edge ports via a doted pattern. Three types of transfers are illustrated in FIG. 2: solid-line arrows indicate a path and a direction in which broadcast packets are forwarded; long-Dash-dot-dot-Long-Dash patterned arrows indicate a path and a direction in which superior Bridge Protocol Data Units (BPDUs) are forwarded; and short-dash patterned arrows indicate a path and a direction in which inferior BPDUs are forwarded.

Connecting a set of ES-based servers in a full-mesh topology, such as the ES-based servers of an ES cluster, implies that there is only one hop between any two ES-based servers in the set. As illustrated in FIG. 2, ES-A 211, ES-B 212, ES-C 213, and ES-D 214 of ES cluster 210 are connected in a full-mesh topology by a set of internal ports, such as internal ports 221.0, 221.1, 221.2 of ES-A 211. In some embodiments, an internal port, such as internal port 221.0, is a port on a first ES-based server that is directly connected to a port on a second ES-based server. In some embodiments, internal ports are automatically detected, at least in part, via a special OSTP hello message. In other embodiments, internal ports are configured manually by a user, such as via a Command-Line Interface (CLI) language. One or more of the following characterizes a port as being an internal port: a port of an ES-based server while the ES-based server is in OSTP mode; a port on an internal connection in an ES cluster; a port on an internal connection in a full-mesh portion of an ES cluster; a port that is in OSTP mode; a port that is enabled to send and/or to receive OSTP hello messages; and a port that receives OSTP hello messages.

In some embodiments, when a full-mesh mode is used among a set of ES-based servers, standard STP processing is suspended on VLAN connections interconnecting the set of ES-based servers, and all ports interconnecting the set of ES-based servers are placed in a selective forwarding state. In various embodiments, the full-mesh mode is used on some but not all of the VLAN connections interconnecting the set of ES-based servers. In further embodiments, standard STP processing is resumed if the full-mesh mode is no longer in effect, such as due to a break in a link that disrupts full-mesh connectivity. In some embodiments, when a full-mesh mode is used among a set of ES-based servers, all ports interconnecting the set of ES-based servers are enabled to use an OSTP.

Some ports, such as regular ports 243 or 244, connect to an ES server, such as either of ES-E 215 or ES-F 216, that does not have full-mesh connectivity and/or is not part of an ES cluster. Such regular ports follow a standard STP. (In a more complicated example of some embodiments, either or both of pair ES-D 214 and ES-F 216 and pair ES-C 213 and ES-E 215 are additionally treated as two-node, full-mesh topologies, using the rules described herein, with either or both of ports 243 and 244 being internal ports under such a scenario.)

In FIG. 2 external ports 231 or 232 are connected to an external network on which a standard spanning tree protocol is run. One of these external ports acts as a gateway between the ES cluster and the external network. In some embodiments, external ports are manually configured by a user.

An STP edge port, such as either of STP edge ports 241 or 242, is connected to a network segment on which no spanning tree protocol is run, for example a network segment containing a generic (Non-ES) server. In various embodiments, the STP edge port starts forwarding as soon as a connecting link is up (without having to wait for resolution of a protocol, such as a standard STP). According to various embodiments, STP edge ports are configured one or more of: manually by a user; and manually using standard STP configuration.

In some embodiments, a particular port has a different type on different VLANs. For example, a particular port connecting to a first VLAN is an external port, and the particular port connecting to a second VLAN is an STP edge port or a regular port. In various embodiments and in some usage scenarios, an internal port connecting to a first VLAN is enabled to use an OSTP, and the internal port connecting to a second VLAN is not enabled to use the OSTP. In some embodiments and in some usage scenarios, an internal port connecting to a first VLAN is in a selective forwarding state, and at a same time, the internal port connecting to a second VLAN is not in a selective forwarding state.

In a first set of embodiments, once a full-mesh topology is established in an ES cluster and ports are identified as internal, regular, external, or STP edge, loop-free packet forwarding on a VLAN is achieved, at least in part, and with respect to a single node (e.g., an ES-based server) connecting to the VLAN and to traffic arriving on the VLAN, as follows:
 a) non-internal ports (within the ES cluster) are in an STP disabled state (and thus forward all traffic); and
 b) packets received from an internal port are not forwarded to any other internal ports (of the full-mesh topology), but are forwarded (as per the standard STP) to all other port types within the VLAN.

In the first set of embodiments, a transition of some ports of an ES chassis to a selective forwarding state enables other ports of the ES chassis (with respect to a same VLAN) to transition to a disabled state. In a second set of embodiments, step (a) above is replaced with:
 a) a standard STP is used on non-internal ports.

In the second set of embodiments, a transition of some ports of an ES chassis to a selective forwarding state does not enable other ports of the ES chassis (with respect to a same VLAN) to transition to other states.

In some usage scenarios, a standard STP places some internal ports in a blocked state to impose a spanning tree on the full-mesh topology. In some embodiments and usage scenarios, an OSTP places all internal ports in a selective forwarding state. In various embodiments using the OSTP, packet transfer across the full-mesh topology uses a shortest point-to-point path, and no unicast transfer from outside the full-mesh passes through more than two nodes in the full-mesh topology.

As an example of lower latency via an OSTP and a full-mesh topology, consider in FIG. 2 a (non-broadcast) transfer from ES-D 214 to generic server 288. Following a standard STP, the transfer requires three hops: ES-D 214 to ES-A 211, ES-A 211 to ES-B 212, and ES-B 212 to generic server 288. Using the OSTP and advantageously using the full-mesh topology, the transfer requires only two hops: ES-D 214 to ES-B 212, and ES-B 212 to generic server 288. Because the OSTP disables the use of spanning tress within the full-mesh topology, all links of the full-mesh topology are usable.

In some embodiments, an ES-based server is conceptually similar to a switch and/or to a bridge, moving packets among multiple ports of the ES-based server. In some embodiments, a port on an ES-based server that is in a selective forwarding state tags a received packet with a bit, such as a bit in an internal packet header, indicating arrival at the port in the selective forwarding state. When the packet is forward to an egress port of the ES-based server, presence of the bit determines an action of the egress port: if the egress port is in the selective forwarding state, the packet is dropped, and otherwise the packet is forwarded as normal.

In further embodiments, instead of a single bit, a multi-bit ID is used, enabling a plurality of independent, full-mesh topologies to be active at a single ES-based server. For example, an ingress port in the selective forwarding state tags a received packet with an ID of a particular set of ES-based servers (connected with full-mesh connectivity). When the packet is forward to an egress port of the ES-based server, the presence and value of the ID determines, at least in part, an action of the egress port: if the egress port is in the selective forwarding state and is a member of the particular set of ES-based servers (as determined by the ID), the packet is dropped, and otherwise the packet is forwarded as normal.

In some embodiments, at least some actions taken in the selective forwarding state are performed at an ingress port where a packet is received. For example, in various embodiments, an ingress port in the selective forwarding state forwards packets to non-internal ports as normal, but does not forward packets to internal ports.

Loop Breaking in Full-Mesh Topologies: External Network Compatibility

The OSTP techniques described above are not applicable to network equipment unaware of the OSTP. Network segments external to ES clusters thus necessarily use a standard spanning tree to avoid loops. To be compatible with the standard spanning tree in the external network, a set of ES-based servers operating in a full-mesh mode forwards BPDUs generated from the external network in a same way as broadcast packets are forwarded (as described above). Accordingly, in some usage scenarios, the set of ES-based servers appears as a single server on a LAN segment. In other usage scenarios, the set of ES-based servers appears as a single node on each of one or more LAN segments. A spanning tree protocol ensures (by creating a spanning tree on the network containing the ES-based servers) that among a set of ports of equivalent connectivity connecting to the set of ES-based servers, solely one of the ports is in the forwarding state. For example, as illustrated in FIG. 2, in some embodiments, of two external ports (231 and 232) having equivalent connectivity, one of the two external ports (232) is blocked (299) by the spanning tree protocol, so that solely external port 231 is in a forwarding state. (In a more complex example than that illustrated in FIG. 2, an ES cluster is connected to multiple LAN segments. For example, consider an external port connecting ES-D 214 to a distinct external network such that connectivity to the distinct external network is solely via ES-D 214. In this example, the external port on ED-D 214 is not blocked by the spanning tree protocol.) In various embodiments, when the set of ES-based servers is operating in the full-mesh mode using OSTP, both of the external ports (231 and 232) are in a disabled state, a port of an external device, such as a switch, connected to external port 231 is in a forwarding state, and a port of an external device, such as a switch, connected to external port 232 is in a blocked state.

If links connecting two ES-based servers of an ES cluster are not operational, such as by being physically broken, the two ES-based servers are not able to talk to each other. If full-mesh connectivity is broken, the ES cluster falls back to use of a standard STP as a loop breaking mechanism. To avoid this scenario, Link Aggregation Groups (LAGs) are recommended for redundancy and resilience of connections between ES-based servers.

Loop Breaking in Full-Mesh Topologies: Detecting Full-Mesh Topology

In some embodiments, to detect that full-mesh topology is established and/or determined to be valid, OSTP hello messages are flooded to all ports on each VLAN. In some embodiments, the OSTP hello messages are flooded periodically, such as once every two seconds. According to various embodiments, the OSTP hello messages are not flooded on one or more of: external ports; regular ports; and STP edge ports. According to various embodiments, the OSTP hello messages are flooded on one or more of: ports configured to be of an internal type; ports enabled to use an OSTP; all ports of an ES-based server configured to use an OSTP; and all ports of an ES-based server configured to use an OSTP except for ports explicitly configured as a non-internal type (such as external or STP edge). In some usage scenarios, the OSTP hello messages are processed by ES-based servers, but are dropped by other network equipment (such as switches that do not implement the OSTP). In some embodiments, an OSTP hello message from a first ES-based server to a neighbor ES-based server conveys to the neighbor how many neighbors the first ES-based server has. Optionally, the OSTP hello message further conveys whether or not the first ES-based server has determined that full-mesh topology is established among a set of ES-based servers including the neighbor ES-based server.

Figure 3:
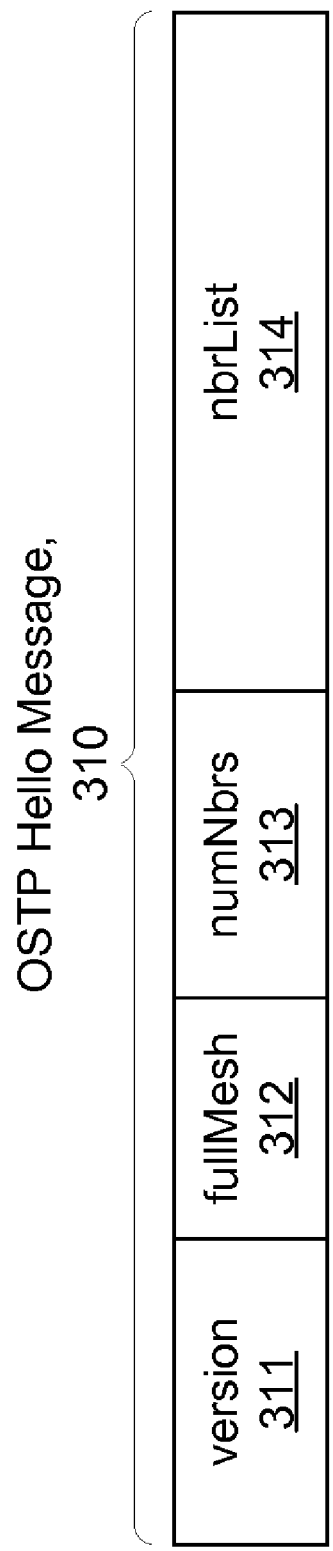
FIG. 3 illustrates selected details of an embodiment of an OSTP hello message used in the full-mesh ES Cluster embodiment of FIG. 2.

An example of the OSTP hello message format is illustrated in FIG. 3 by OSTP hello message 310. "version" 311 is a version of the OSTP hello message format, and is provided to aid forward compatibility. "fullMesh" 312 indicates whether or not a sender of the OSTP hello message considers full-mesh topology established. An ES-based server sourcing an OSTP hello message sets fullMesh 312 to true when the ES-based server detects that a set of neighbors of the ES-based server all have the same set of neighbors. "numNbrs" 313 indicates a number of neighbors a sourcing ES-based server has, including, in various embodiments, the sourcing ES-based server. "nbrList" 314 is a list of identifiers, such as MAC addresses, of all neighbors of the ES-based server. In further embodiments, nbrList 314 is sorted in an order, such as ascending order. According to various embodiments, numNbrs 313 either does or does not include the sourcing ES-based server, and/or nbrList 314 either does or does not include the sourcing ES-based server. According to various embodiments, nbrList 314 is sorted in one of: ascending order, descending order, a first-found order, and a random order.

According to various embodiments, OSTP hello messages are flooded on one or more of: each VLAN for which OSTP is enabled; each configured VLAN (independent of OSTP being enabled); and each configured LAN segment (globally, without a VLAN tag). In some embodiments, OSTP hello messages are flooded per VLAN with a local group address of 01:80:C2:00:00:06. In some embodiments, OSTP hello messages are flooded with an Ethernet type of 0x8888. In some embodiments, on tagged ports, OSTP hello messages are sent with a VLAN tag. In various embodiments and some usage scenarios, OSTP hello messages are discarded by other network equipment, such as switches that do not implement the OSTP. In some embodiments, external ports (of an ES cluster) are configured to prevent OSTP hello messages from entering an external network. In some embodiments, STP edge ports of an ES cluster are configured to prevent OSTP hello messages from exiting the ES cluster.

In some embodiments, an ES-based server determines full-mesh topology is established through a determination that a common subset of neighbors is shared by the ES-based server and the other members of the same subset. In various embodiments, this determination is made at least in part from received OSTP hello messages. In further embodiments, the full-mesh topology is determined to be valid when all ES-based servers of the subset of neighbors consider full-mesh topology valid. For example, an ES-based server receiving OSTP hello messages from a set of neighbors all listing the same set of neighbors determines that full-mesh topology is established, and sets the fullMesh bit in the OSTP hello message that the ES-based server subsequently sources. When all of the set of neighbors have sent an OSTP hello message to the ES-based server with the same set of neighbors and with the fullMesh bit set, the ES-based server determines that the full-mesh topology is valid. According to various embodiments, an internal port of an ES-based server performs an action, such as changing state (optionally via a delay state) to a selective forwarding state, when one or more of: the ES-based server determines that a full-mesh topology is established; and the ES-based server determines that a full-mesh topology is valid. In some embodiments, a delay, such as delay state 420 as illustrated in FIG. 4, is used between particular state transitions to ensure that all ES-based servers among the set of neighbors have observed a state-transition-causing event, such as a determination of validity of a full-mesh topology.

Figure 5:
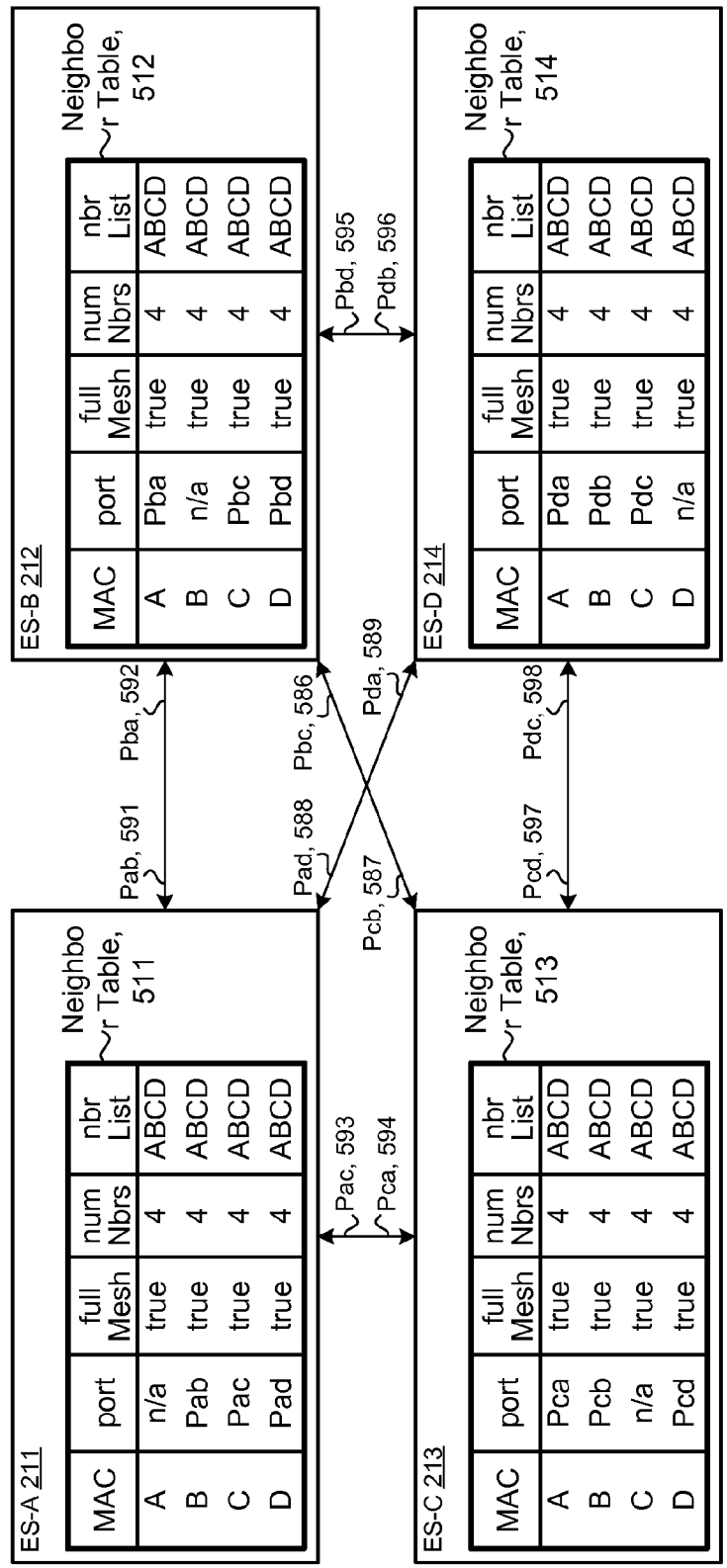
FIG. 5 illustrates selected details of an embodiment having an ES Cluster configuration in which each ES has a same set of neighbors.

An example is illustrated in FIG. 5, where for simplicity, it is assumed that there is solely one VLAN spanning ES-based servers (acting, at least in part, as switches): ES-A 211 (with MAC address A), ES-B 212 (with MAC address B), ES-C 213 (with MAC address C), and ES-D 214 (with MAC address D). Through the exchange of OSTP hello messages, neighbor tables 511, 512, 513, and 514 are established on respective switches of ES-A 211, ES-B 212, ES-C 213, and ES-D 214. (Fields set in a row of the neighbor tables correspond to fields sent in OSTP hello messages by an ES-based server with a MAC address of the row.) As illustrated in the example of FIG. 5, since ES-A 211, ES-B 212, ES-C 213, and ES-D 214 all have a same set of neighbors, full-mesh topology is determined to be established among ES-A, ES-B, ES-C, and ES-D. Furthermore, since the OSTP hello messages all have a fullMesh bit set (as reflected in the neighbor tables), the full-mesh topology is determined to be valid.

Figure 6:
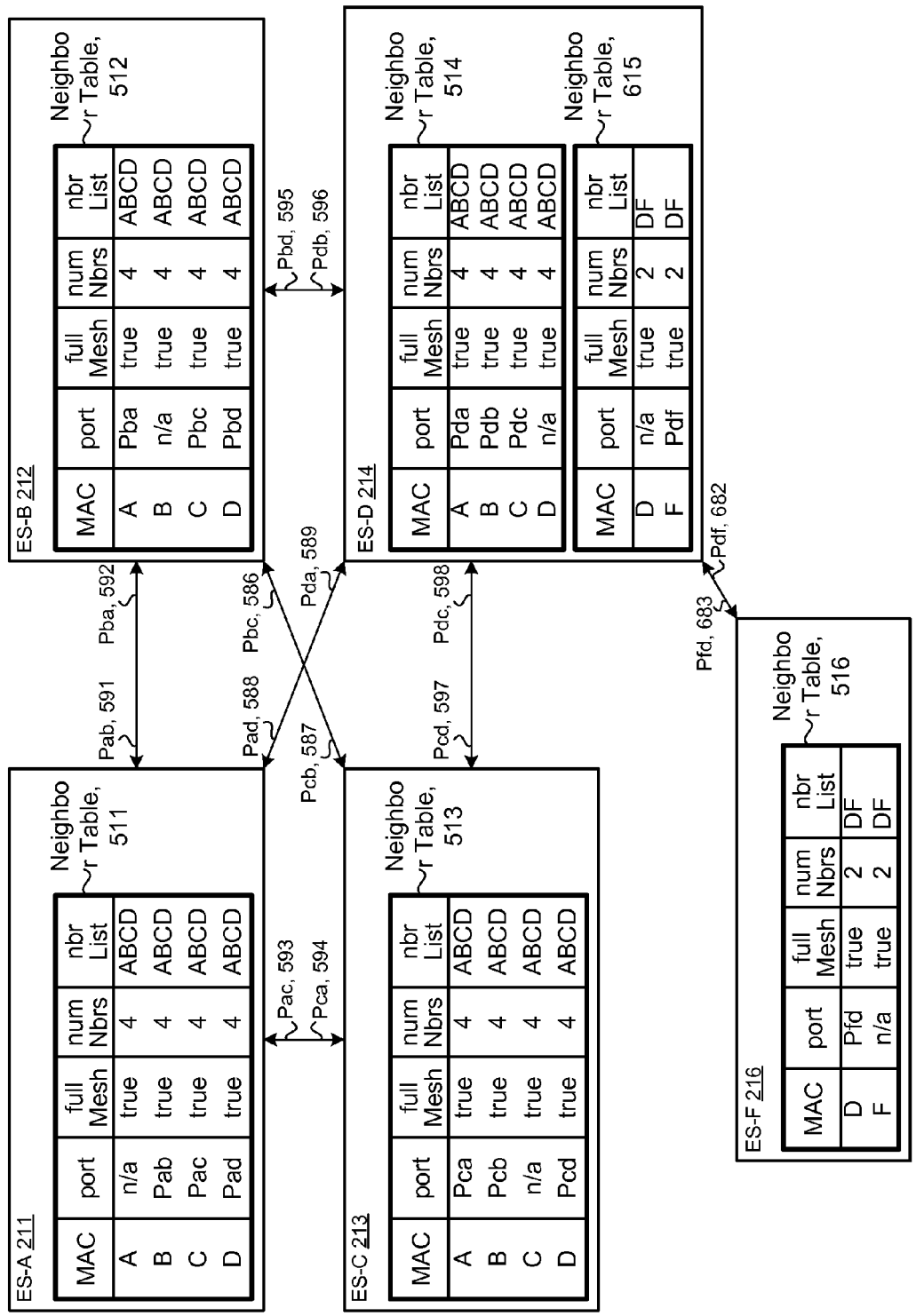
FIG. 6 illustrates selected details of an embodiment having an ES Cluster configuration in which two sets of ES-based servers have a respective same set of neighbors.

A second example is illustrated in FIG. 6, which extends FIG. 5 with the addition of ES-F 216 (with MAC address F). Through the exchange of OSTP hello messages, neighbor tables 511, 512, 513, 514, and 615 are established on respective switches of ES-A 211, ES-B 212, ES-C 213, ES-D 214, and ES-F 216. In various embodiments, neighbor tables 514 and 615 of ES-D are combined into a single neighbor table. As illustrated in the example of FIG. 6, since ES-A 211, ES-B 212, ES-C 213, and ES-D 214 all have a same set of neighbors, full-mesh topology is determined to be established and to be valid among ES-A, ES-B, ES-C, and ES-D. (In this example, ES-D has an additional neighbor, ES-F, not in the same set of neighbors, and the additional neighbor does not prevent recognition of the full-mesh topology.) In some embodiments, OSTP hello messages sent from ES-D to any of ES-A, ES-B or ES-C have, after the full-mesh topology is established among ES-A, ES-B, ES-C, and ES-D, the fullMesh bit set, but OSTP hello messages sent from ES-D to ES-F do not have the fullMesh bit set until full-mesh topology is independently established among ES-D and ES-F. Accordingly, when both ES-D and ES-F determine a full-mesh topology is established among ES-D and ES-F, the fullMesh bit is set in OSTP hello messages exchanged between ES-D and ES-F, and subsequently, the full-mesh topology among ES-D and ES-F is determined to be valid.

According to various embodiments, once full-mesh topology is established among a set of ES-based servers on a VLAN, one or more of: a standard STP is disabled on all ES-based servers of the set (and, in further embodiments, solely for the VLAN); and an OSTP is enabled on all ES-based servers of the set (and, in further embodiments, solely for the VLAN). In further embodiments, packets from internal ports are selectively forwarded to ports that are not internal ports of the VLAN (instead of standard STP forwarding to all ports of the VLAN). According to various embodiments, if the full-mesh topology is broken, one or more of: a standard STP is (re)enabled on all ES-based servers of the set (and, in some embodiments, solely for the VLAN); and an OSTP is disabled on all ES-based servers of the set (and, in some embodiments, solely for the VLAN). In further embodiments, breaking the full-mesh topology results in some ports being blocked by a standard STP to prevent loops. If the full-mesh topology becomes broken, packets are subsequently forwarded as per the standard STP. In some embodiments, whenever there is a transition (to or from full-mesh mode), a forwarding database is flushed and traffic interruptions optionally result. In various embodiments, breaking a link between a first pair of ES-based servers, and thus breaking a full-mesh topology among a set of ES-based servers containing the first pair, temporarily transitions the set of ES-based servers to use a standard STP. Sans the first pair, a subset of the set of ES-based servers subsequently determines that a smaller full-mesh topology is valid among the subset and transitions the subset to use OSTP.

According to various embodiments, a type of a port of an ES-based server is determined, at least in part, via one or more of: a (manual) configuration of the port; a configuration of other ports on the ES-based server; a configuration of the ES-based server; and receipt of OSTP hello messages by the port. In some embodiments, external ports are configured manually. In some embodiments, internal ports are determined, at least in part, via receipt of OSTP hello messages and determination of a same set of neighbors among all of the same set of neighbors. In some embodiments, regular ports are determined, at least in part, via receipt of OSTP hello messages without a determination of a same set of neighbors among all of the same set of neighbors.

In some embodiments, hello messages are sent as a modified form of BPDUs by enhancing a standard format of the BPDUs to include, or in other embodiments to optionally include, information provided by a special hello message format (such as illustrated by OSTP hello message 310 in FIG. 3). In various embodiments, enhancing the format of the BPDUs necessitates all nodes on the network understand the enhanced format. In other embodiments, the enhanced format is solely used internally within an ES cluster (or, in various embodiments, within an OSTP-enabled portion of a network), and egress ports convert the enhanced format to the standard format.

In some embodiments, ports are statically configured to be in a full-mesh mode, and no OSTP hello messages are used to determine full-mesh connectivity. For example, in some usage scenarios, internal ports are part of LAGs and thus have high reliability. The internal ports are configured to be in a full-mesh mode (full-mesh connectivity is established for each port, and is determined to be valid among the ports, by default). No OSTP hello messages are exchanged among the ports, and the ports use a selective forwarding state rather than a forwarding state, to advantageously use the full-mesh connectivity.

In various embodiments, individual ports on an ES-based server, or in some embodiments the ES-based server as a whole, learn identities (e.g., MAC addresses) of adjacent nodes (e.g., other ES-based servers) from received packets, similar to learning in a switch. In further embodiments, by disabling use of a spanning tree protocol (or, in various embodiments, by enabling use of an OSTP) on internal ports in an ES cluster, each of the ES-based servers in the ES cluster rapidly learns the one-hop connections to the other ES-based servers.

Loop Breaking in Full-Mesh ES Clusters: Command Line Interface

Below are illustrations of Command Line Interface (CLI) syntax in one embodiment. "esfmo" is an abbreviation for "ES full-mesh optimization".

The full-mesh spanning tree optimization is solely in action if spanning tree is enabled and full-mesh topology is established and, in some embodiments, valid. The following commands are used to enable and disable full-mesh optimization on a VLAN:

host_system(config)# spanning-tree vlan <vid> esfmo
host_system(config)# no spanning-tree vlan <vid> esfmo The following "external" commands are used to indicate ports that are connected to a third party switch to disable the sending of OSTP hello messages on those ports:

host_system(config-if GigabitEthernet1/1)# spanning-tree vlan <vid> external
host_system(config-if GigabitEthernet1/1)# no spanning-tree vlan <vid> external The following "show" commands are used to display all information related to full-mesh optimization:

host_system# show spanning-tree bridge esfmo
host_system# show spanning-tree vlan <vid> bridge esfmo Example Hardware Embodiment Techniques In some embodiments, various combinations of all or portions of functions performed by an Enterprise Chassis (such as ES1 110A of FIG. 1), an enterprise cluster (such as enterprise cluster 210 of FIG. 2), and portions of a processor, microprocessor, system-on-a-chip, application-specific-integrated-circuit, or other circuitry providing all or portions of the aforementioned functions, are specified by descriptions compatible with processing by a computer system (e.g. Verilog, VHDL, or any similar hardware description language). In various embodiments the processing comprises any combination of interpretation, compilation, simulation, and synthesis to produce, to verify, or to specify logic and/or circuitry suitable for inclusion on one or more integrated circuits. Each said integrated circuit, according to various embodiments, is designed and/or manufactured according to a variety of techniques. The techniques comprise a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

In some embodiments, various combinations of all or portions of functions performed to configure servers and/or ports, to implement an OSTP (as illustrated in FIG. 4), to send or to receive OSTP hello messages (such as OSTP hello message 310 of FIG. 3), to build and/or to populate neighbor tables (such as neighbor table 511 of FIG. 5), to establish and/or to validate a full-mesh topology (as described above), and other operations necessary to use an OSTP in a network (to be OSTP-enabled or at least OSTP-aware) are specified, designed, and/or manufactured, at least in part, by one or more of software, firmware, on-chip microcode, and off-chip microcode.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (i.e., the callouts or numerical designators) used to identify and reference the features and elements of the embodiments.

The words "comprises" or "comprising" are specifically intended to be construed as being implicitly followed by the words "at least" and thus are specifically intended to be construed as abstractions describing logical sets of open-ended scope. The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as the quantity and type of processors and memory on the modules; the channel bandwidths; the degree of redundancy for any particular component or module; the particular version of an interface standard or component; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, functions, operations, routines, and sub-routines. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design comprise insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A system comprising:
   a network comprising a plurality of nodes wherein forwarding is controlled, at least in part, by an optimized spanning tree protocol (OSTP) comprising a selective forwarding state;
   a server cluster; and
   wherein, in a full-mesh portion of the network, the OSTP
      is aware of the full-mesh portion,
      is enabled to provide, to the nodes connected by the full-mesh portion, an explicit indication of whether or not full mesh topology is considered established, and
      is further enabled to forward packets in one hop between any two of the nodes connected by the full-mesh portion;
   wherein the full mesh is a first full mesh;
   wherein the server cluster comprises a plurality of servers, each one of a first subset of the servers comprises one or more of the nodes of the network, and a second subset of the first subset of the servers are connected in a second full mesh; and
   wherein the second full mesh is identical to the first full mesh.

2. The system of claim 1 wherein a packet sent via any two distinct ones of the nodes of the full-mesh portion from a first one of the nodes outside of the full-mesh to a second one of the nodes outside of the full-mesh portion does not pass through any of the nodes of the full-mesh portion other than the two distinct nodes.

3. The system of claim 1 wherein ports forming connections between the nodes connected by the full-mesh portion use the selective forwarding state.

4. The system of claim 1 wherein the full-mesh portion comprises more than two of the nodes.

5. The system of claim 1 wherein the server cluster is an Enterprise Server (ES) cluster, and the servers are ES-based servers.

6. The system of claim 5 wherein at least some of the second subset of the servers comprise physical partitions of a physically-partitionable symmetric multiprocessor within an ES chassis.

7. The system of claim 1 wherein the second subset of the servers is at least three of the servers.

8. The system of claim 1 wherein each of the second subset of the servers comprises one or more respective ports; and
   wherein the full mesh is instantiated among particular ones of the respective ports of the second subset of the servers.

9. The system of claim 8 wherein a type of each of the respective ports is selected from the group consisting of external, internal, regular, and STP edge.

10. The system of claim 8 wherein the particular ports are of the internal type.

11. The system of claim 8 wherein the particular ports exchange messages to, at least in part, establish presence of the full mesh.

12. The system of claim 11 wherein the messages comprise a set of neighbor IDs, each of the neighbor IDs identifying one of the servers.

13. The system of claim 12 wherein the neighbor IDs are MAC addresses.

14. The system of claim 11 wherein the messages are OSTP hello messages.

15. The system of claim 11 wherein the presence of the full mesh is, at least in part, established by a particular one of the second subset of the servers when a plurality of the messages received by the particular server indicate a set of neighbors of the particular server all have each one of the set of neighbors as a neighbor.

16. The system of claim 15 wherein the set of neighbors comprises at least three of the servers.

17. The system of claim 15 wherein subsequent to establishing the presence of the full mesh, each of the particular ports is enabled to use the optimized spanning tree protocol.

18. The system of claim 15 wherein subsequent to establishing the presence of the full mesh, each of the particular ports is enabled to be in the selective forwarding state.

19. The system of claim 18 wherein subsequent to establishing the presence of the full mesh, each of the particular ports is enabled to be in a delay state prior to being enabled to be in the selective forwarding state.

20. The system of claim 15 wherein the messages further comprise a state indicating the establishment of the presence of the full mesh, the state being in accordance with the explicit indication of whether or not full mesh topology is considered established, and subsequent to establishing the presence of the full mesh, a plurality of the messages sent by the particular server have the state indicating the establishment of the presence of the full mesh.

21. The system of claim 20 wherein the full mesh is determined to be valid by the particular server when, subsequent to establishing the presence of the full mesh, a plurality of the messages received by the particular server indicate that each one of the set of neighbors all have the state indicating the establishment of the presence of the full mesh.

22. The system of claim 21 wherein subsequent to determining validity of the full mesh, each of the particular ports is enabled to use the optimized spanning tree protocol.

23. The system of claim 21 wherein subsequent to determining validity of the full mesh, each of the particular ports is enabled to be in the selective forwarding state.

24. The system of claim 23 wherein subsequent to determining validity of the full mesh, each of the particular ports is enabled to be in a delay state prior to being enabled to be in the selective forwarding state.

* * * * *